United States Patent
Matsumoto

(10) Patent No.: US 10,139,482 B2
(45) Date of Patent: Nov. 27, 2018

(54) LOCATION IDENTIFICATION APPARATUS AND COMMUNICATION TERMINAL

(71) Applicant: MITSUBISHI ELECTRIC CORPORATION, Tokyo (JP)

(72) Inventor: Mitsuhiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/761,394

(22) PCT Filed: Dec. 9, 2015

(86) PCT No.: PCT/JP2015/084485
§ 371 (c)(1),
(2) Date: Mar. 19, 2018

(87) PCT Pub. No.: WO2017/098596
PCT Pub. Date: Jun. 15, 2017

(65) Prior Publication Data
US 2018/0299539 A1 Oct. 18, 2018

(51) Int. Cl.
*H04W 24/00* (2009.01)
*G01S 11/06* (2006.01)
*H04W 64/00* (2009.01)

(52) U.S. Cl.
CPC ............ *G01S 11/06* (2013.01); *H04W 64/00* (2013.01)

(58) Field of Classification Search
None
See application file for complete search history.

(56) References Cited

U.S. PATENT DOCUMENTS 7,047,022 B2 5/2006 Aoyama
8,914,043 B2 12/2014 Zelinka
(Continued)

FOREIGN PATENT DOCUMENTS

EP 1 206 152 A2 5/2002
JP 2002-152798 A 5/2002
(Continued)

OTHER PUBLICATIONS

International Search Report for PCT/JP2015/084485 (PCT/ISA/210) dated Feb. 23, 2016.

*Primary Examiner* — Suhail Khan
(74) *Attorney, Agent, or Firm* — Birch, Stewart, Kolasch & Birch, LLP

(57) ABSTRACT

A communication terminal (200) propagates a distance packet, and the distance packet is transmitted to a location identification apparatus (300) via an access point (110). The distance packet includes a start-point distance, an end-point distance, and a terminal distance. The start-point distance is a distance between a start-point terminal and a start-point point, which is an access point detected by the start-point terminal. The end-point distance is a distance between an end-point terminal and an end-point point, which is an access point detected by the end-point terminal. The terminal distance is a distance between each other of communication terminals. The location identification apparatus identifies a location of each communication terminal based on distances included in the distance packet, coordinate values of the start-point point, and coordinate values of the end-point point.

2 Claims, 40 Drawing Sheets

(56) References Cited

U.S. PATENT DOCUMENTS

| | | | |
|---|---|---|---|
| 9,268,007 B2 | 2/2016 | Malnati et al. | |
| 2002/0055362 A1 | 5/2002 | Aoyama | |
| 2011/0134781 A1 | 6/2011 | Malnati et al. | |
| 2013/0051255 A1* | 2/2013 | Estevez | H04W 64/00 370/252 |
| 2013/0281122 A1 | 10/2013 | Zelinka | |

FOREIGN PATENT DOCUMENTS

| | | |
|---|---|---|
| JP | 2005-223436 A | 8/2005 |
| JP | 2006-38771 A | 2/2006 |
| JP | 2007-221541 A | 8/2007 |
| JP | 2008-244942 A | 10/2008 |
| JP | 2009-17217 A | 1/2009 |
| JP | 2009-159458 A | 7/2009 |
| JP | 2011-172113 A | 9/2011 |
| JP | 2011-525073 A | 9/2011 |
| JP | 2012-191443 A | 10/2012 |
| JP | 2015-521400 A | 7/2015 |
| WO | WO 2013/158402 A1 | 10/2013 |

\* cited by examiner

140: START RESPONSE PACKET

Fig. 15

410:HISTORY TABLE

| HISTORY IDENTIFIER | TIME STAMP |
|---|---|
| APa0001 | 20150928121110 |
| APb0001 | 20150928121111 |
| APc0001 | 20150928121112 |
| APd0001 | 20150928121113 |
| APa0002 | 20150928121120 |

Fig. 16

420: MEASURED DISTANCE TABLE

| FIRST IDENTIFIER (421) | SECOND IDENTIFIER (422) | MEASURED DISTANCE (126) | HISTORY IDENTIFIER (411) |
|---|---|---|---|
| APc | CTa | 2 | APc0001 |
| CTa | CTb | 7 | APc0001 |
| CTb | CTc | 4 | APc0001 |
| CTc | CTd | 6 | APc0001 |
| CTd | CTe | 4 | APc0001 |
| CTe | APa | 6 | APc0001 |
| CTg | APa | 8 | APc0001 |
| CTe | CTg | 3 | APc0001 |
| CTf | CTe | 6 | APc0001 |
| CTf | CTd | 5 | APc0001 |
| CTc | CTf | 4 | APc0001 |
| CTc | CTh | 9 | APc0001 |
| CTb | CTh | 7 | APc0001 |
| CTh | CTf | 7 | APc0001 |
| CTf | CTi | 7 | APc0001 |
| CTh | CTi | 7 | APc0001 |
| CTh | CTg | 8 | APc0001 |
| CTh | CTj | 4 | APc0001 |
| CTh | CTl | 10 | APc0001 |

Fig. 17

420: MEASURED DISTANCE TABLE

| FIRST IDENTIFIER (421) | SECOND IDENTIFIER (422) | MEASURED DISTANCE (126) | HISTORY IDENTIFIER (411) |
|---|---|---|---|
| CTj | CTi | 2 | APd0001 |
| CTi | CTk | 4 | APd0001 |
| CTj | CTk | 5 | APd0001 |
| CTh | CTn | 4 | APd0001 |
| CTj | CTn | 6 | APd0001 |
| CTj | CTm | 5 | APd0001 |
| CTl | CTm | 6 | APd0001 |
| CTl | CTo | 7 | APd0001 |
| CTo | CTp | 6 | APd0001 |
| CTm | CTp | 6 | APd0001 |
| CTm | CTn | 5 | APd0001 |
| CTp | CTr | 6 | APd0001 |
| CTn | CTr | 6 | APd0001 |
| CTq | CTp | 4 | APd0001 |
| CTo | CTq | 3 | APd0001 |
| CTo | APd | 7 | APd0001 |
| CTr | CTs | 3 | APd0001 |
| CTs | APb | 3 | APd0001 |

| TARGET TERMINAL | ADJACENT TERMINAL | DISTANCE |
|---|---|---|
| CTj | CTh | 4 |
| CTj | CTi | 2 |
| CTj | CTk | 5 |
| CTj | CTn | 6 |
| CTj | CTm | 5 |

451

(2)

| CLOSEST TERMINAL | ADJACENT TERMINAL | DISTANCE |
|---|---|---|
| CTi | CTh | 7 |
| CTi | CTf | 7 |
| CTi | CTg | 8 |
| CTi | CTk | 4 |

452

(3)

| TARGET TERMINAL | ADJACENT TERMINAL | DISTANCE |
|---|---|---|
| CTj | CTh | 9 |
| CTj | CTf | 9 |
| CTj | CTg | 10 |
| CTj | CTk | 5 |

453

(4)

| TARGET TERMINAL | ADJACENT TERMINAL | DISTANCE |
|---|---|---|
| CTj | CTh | 4 |
| CTj | CTk | 5 |
| CTj | CTn | 6 |
| CTj | CTm | 5 |
| CTj | CTf | 9 |
| CTj | CTg | 10 |

430: ESTIMATED DISTANCE TABLE

| TERMINAL IDENTIFIER (431) | AP IDENTIFIER (432) | | | | HISTORY IDENTIFIER (411) |
|---|---|---|---|---|---|
| | APa | APb | APc | APd | |
| CTa | 27 | 36 | 2 | 38 | APa0001 |
| CTb | 20 | 29 | 9 | 31 | APa0001 |
| CTc | 16 | 31 | 13 | 33 | APa0001 |
| CTd | 10 | 32 | 19 | 36 | APa0001 |
| CTe | 6 | 31 | 23 | 37 | APa0001 |
| CTf | 12 | 27 | 17 | 31 | APa0001 |
| CTg | 8 | 28 | 26 | 34 | APa0001 |
| CTh | 19 | 22 | 16 | 24 | APa0001 |
| CTi | 16 | 20 | 23 | 26 | APa0001 |
| CTj | 18 | 18 | 20 | 24 | APa0001 |
| CTk | 20 | 16 | 25 | 28 | APa0001 |
| CTl | 29 | 23 | 26 | 14 | APa0001 |
| CTm | 23 | 17 | 25 | 19 | APa0001 |
| CTn | 24 | 12 | 26 | 24 | APa0001 |
| CTo | 36 | 18 | 33 | 7 | APa0001 |
| CTp | 29 | 12 | 31 | 13 | APa0001 |
| CTq | 33 | 16 | 35 | 10 | APa0001 |
| CTr | 30 | 6 | 32 | 19 | APa0001 |
| CTs | 33 | 3 | 35 | 22 | APa0001 |

433: ESTIMATED DISTANCE

Fig. 26

400:ACCESS POINT TABLE

| ACCESS POINT IDENTIFIER (401) | COORDINATE VALUES (402) |
|---|---|
| APa | (Xa, Ya) |
| APb | (Xb, Yb) |
| APc | (Xc, Yc) |
| APd | (Xd, Yd) |

Fig. 31

440: TERMINAL TABLE

| TERMINAL IDENTIFIER (441) | COORDINATE VALUES (442) |
|---|---|
| : | : |
| CTj | (Xj, Yj) |
| : | : |

LOCATION IDENTIFICATION APPARATUS AND COMMUNICATION TERMINAL

TECHNICAL FIELD

The present invention relates to a technique for identifying the location of a communication terminal.

BACKGROUND ART

As a method of identifying the location of a terminal, there is a method disclosed in Patent Literature 1 or Patent Literature 2.

The method disclosed in Patent Literature 1 is a method of acquiring location information from a terminal situated at a short distance and identifying the self-location based on the acquired location information.

In this method, the terminal is required to be present at a short distance. Moreover, as the distance between terminals is larger, errors in location become larger.

The method disclosed in Patent Literature 2 is a method of identifying the distance between terminals based on the intensity of radio waves or the delay of radio waves, geometrically deriving a directional relationship between the terminals based on the identified distance, and identifying the locations of the terminals based on the derived directional relationship.

In this method, terminals which are able to be accessed by all of the terminals whose locations are identified are required. Specifically, in the case of identifying the location of each of a terminal A and a terminal B, a terminal C, a terminal D, and a terminal E which are able to be accessed by both the terminal A and the terminal B are required. In this case, if at least one of the terminals C to E is absent, it is impossible to identify the location of each of the terminal A and the terminal B.

CITATION LIST

Patent Literature

Patent Literature 1: JP-A-2005-223436
Patent Literature 2: JP-A-2007-221541

SUMMARY OF INVENTION

Technical Problem

An object of the invention is to enable identifying the location of each communication terminal.

Solution to Problem

A location identification apparatus according to the present invention includes:

a reception unit to receive a distance packet including, as a start-point distance, a distance between a start-point terminal, which is a communication terminal, and a start-point point, which is an access point detected by the start-point terminal, including, as an end-point distance, a distance between an end-point terminal, which is a communication terminal different from the start-point terminal, and an end-point point, which is an access point detected by the end-point terminal, and including, as a terminal distance, a distance between each other of a plurality of communication terminals including the start-point terminal and the end-point terminal; and an identification unit to identify a location of each communication terminal based on the start-point distance, the end-point distance, and the terminal distance which are included in the received distance packet, coordinate values of the start-point point, and coordinate values of the end-point point.

Advantageous Effects of Invention

According to the invention, a distance packet including a start-point distance, an end-point distance, and a terminal distance is received. Then, it becomes possible to identify the location of each communication terminal based on the start-point distance, the end-point distance, the terminal distance, coordinate values of a start-point point, and coordinate values of an end-point point.

BRIEF DESCRIPTION OF DRAWINGS

FIG. 15 is a configuration diagram of a history table 410 in the embodiment 1.

FIG. 16 is a configuration diagram of a measured distance table 420 in the embodiment 1.

FIG. 17 is a configuration diagram of the measured distance table 420 in the embodiment 1.

FIG. 20 is a diagram illustrating a specific example of the distance between terminals in the embodiment 1.

FIG. 22 is a configuration diagram of an estimated distance table 430 in the embodiment 1.

FIG. 26 is a configuration diagram of an access point table 400 in the embodiment 1.

FIG. 31 is a configuration diagram of a terminal table 440 in the embodiment 1.

DESCRIPTION OF EMBODIMENTS

Embodiment 1

A location identification system 100 which identifies the location of a communication terminal 200 is described based on FIG. 1 to FIG. 31.

———Description of Configuration———

Figure 1:
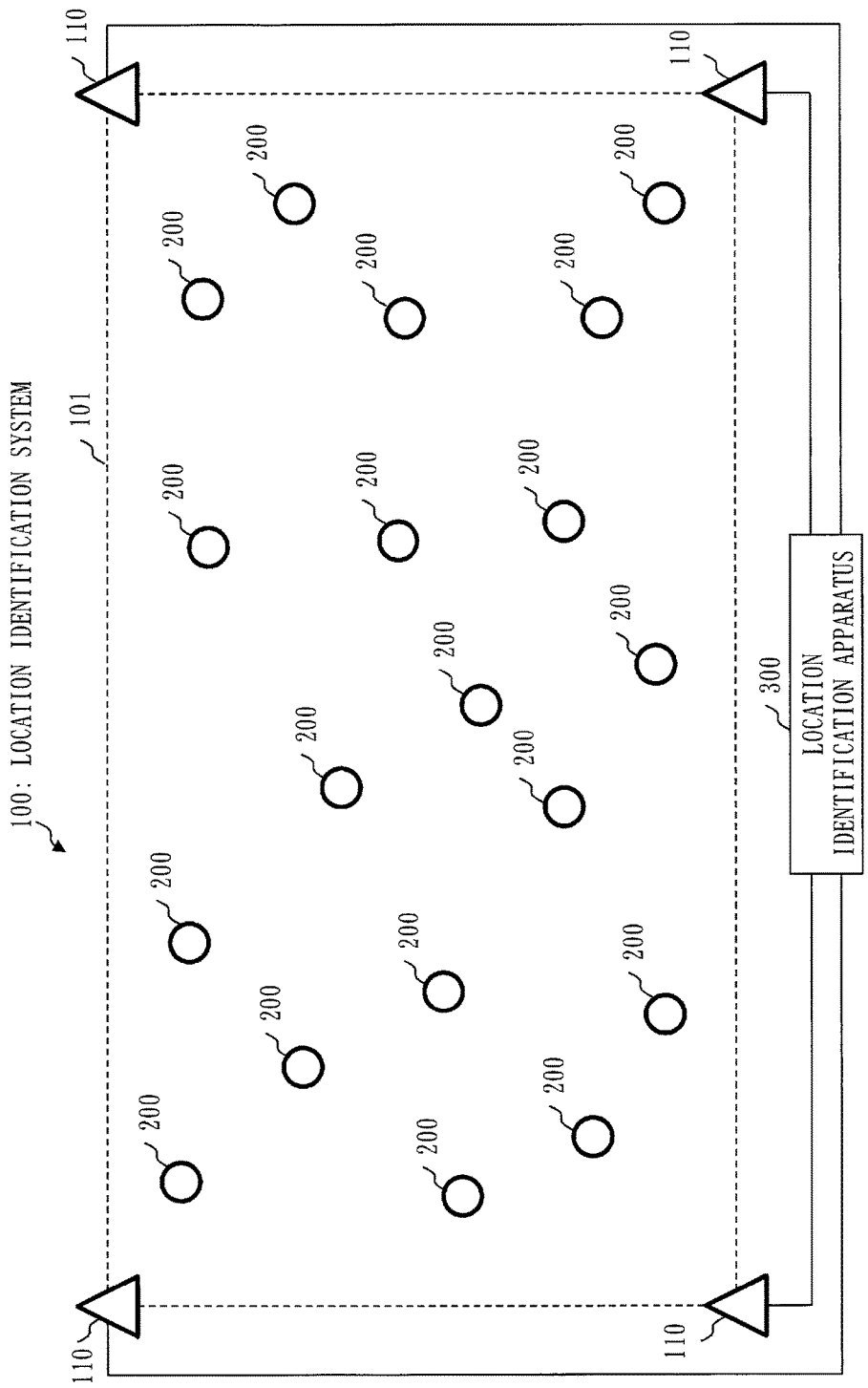
FIG. 1 is a configuration diagram of a location identification system 100 in an embodiment 1.

A configuration of the location identification system 100 is described based on FIG. 1.

The location identification system 100 includes a plurality of communication terminals 200, a plurality of access points 110, and a location identification apparatus 300.

The communication terminal 200 is a terminal having the function to perform communication via radio waves. In other words, the communication terminal 200 is a wireless terminal. A specific communication terminal 200 is a portable terminal such as a smartphone.

More specifically, the communication terminal 200 performs communication with a communication terminal 200 by Bluetooth (registered trademark), and performs communication with the access point 110 by WiFi (registered trademark). Moreover, the communication terminal 200 performs communication with the location identification apparatus 300 via the access point 110.

The access point 110 is a device which connects a wireless terminal to a network.

More specifically, the access point 110 connects the communication terminal 200 to a network to which the location identification apparatus 300 is connected.

The plurality of access points 110 form a location identification area 101. The location identification area 101 is an area which serves as a target for identifying the location of the communication terminal 200.

More specifically, four access points 110 are arranged at portions corresponding to vertexes of a quadrangle, so that a quadrangular location identification area 101 surrounded by the four access points 110 is formed.

The location identification apparatus 300 is an apparatus which identifies the location of the communication terminal 200 that is present in the location identification area 101.

Figure 2:
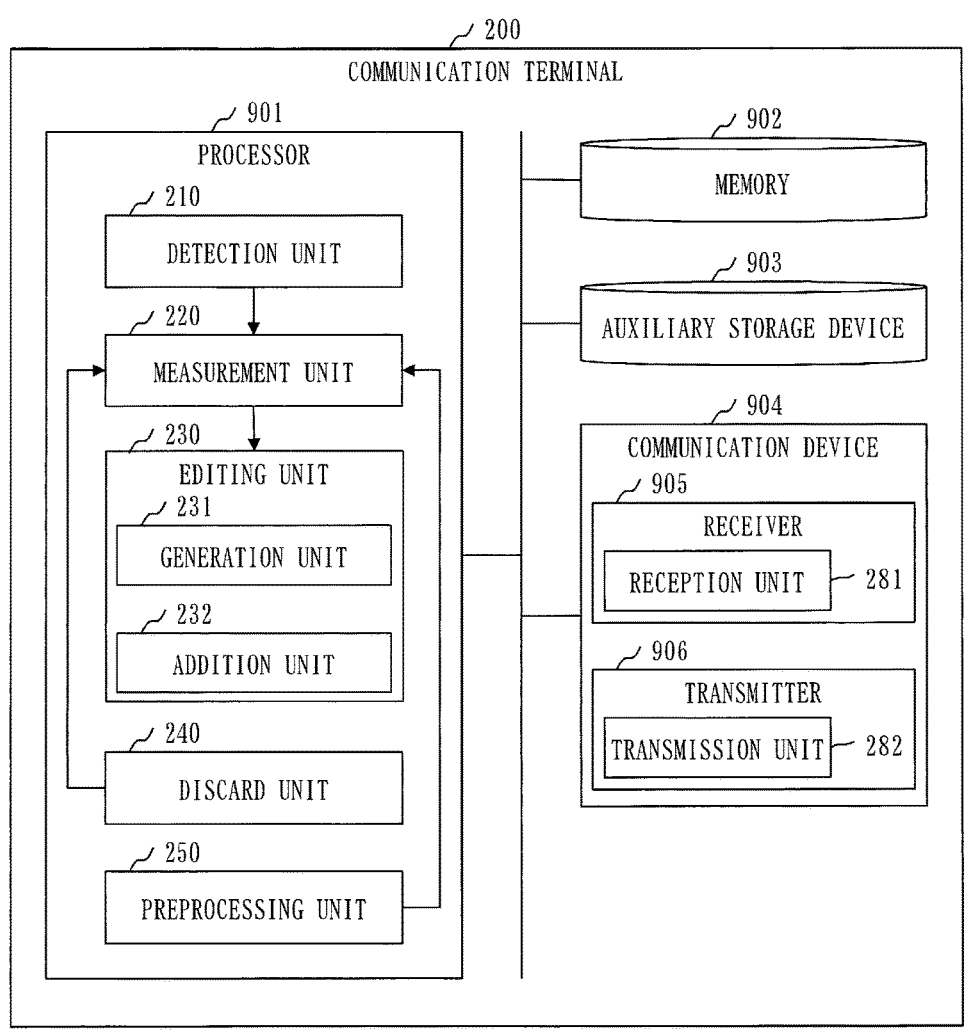
FIG. 2 is a configuration diagram of a communication terminal 200 in the embodiment 1.

A configuration of the communication terminal 200 is described based on FIG. 2.

The communication terminal 200 is a computer including hardware such as a processor 901, a memory 902, an auxiliary storage device 903, and a communication device 904. The processor 901 is connected to other hardware via a signal line.

The processor 901 is an integrated circuit (IC) which performs processing, and controls other hardware. More specifically, the processor 901 is a CPU, a DSP, or a GPU. CPU is an abbreviation for central processing unit, DSP is an abbreviation for digital signal processor, and GPU is an abbreviation for graphics processing unit.

The memory 902 is a volatile storage device. The memory 902 is also called a main storage device or a main memory. More specifically, the memory 902 is a random access memory (RAM).

The auxiliary storage device 903 is a non-volatile storage device. More specifically, the auxiliary storage device 903 is a ROM, an HDD, or a flash memory. ROM is an abbreviation for read-only memory, and HDD is an abbreviation for hard disk drive.

The communication device 904 includes a receiver 905 and a transmitter 906. More specifically, the communication device 904 is a communication chip or a network interface card (NIC).

The communication terminal 200 includes, as elements of a functional configuration, "units" such as a detection unit 210, a measurement unit 220, an editing unit 230, a discard unit 240, and a preprocessing unit 250. The editing unit 230 includes a generation unit 231 and an addition unit 232. The function of a "unit" is implemented by software. The function of a "unit" is described below.

A program for implementing the function of a "unit" is stored in the auxiliary storage device 903. The program for implementing the function of a "unit" is loaded into the memory 902 and is then executed by the processor 901.

Furthermore, an operating system (OS) is stored in the auxiliary storage device 903. At least a part of the OS is loaded into the memory 902 and is then executed by the processor 901.

Thus, the processor 901 executes the program for implementing the function of a "unit" while executing the OS.

Data obtained by executing the program for implementing the function of a "unit" is stored in a storage device such as the memory 902, the auxiliary storage device 903, a register included in the processor 901, or a cache memory included in the processor 901. These storage devices function as a storage unit which stores data.

Furthermore, the communication terminal 200 can include a plurality of processors 901, and the plurality of processors 901 can execute the program for implementing the function of a "unit" in cooperation with each other.

Data to be used, generated, input or output, or transmitted or received by the communication terminal 200 is stored in the memory 902.

The communication device 904 functions as a communication unit which communicates data, the receiver 905 functions as a reception unit 281 which receives data, and the transmitter 906 functions as a transmission unit 282 which transmits data.

Hardware obtained by integrating the processor 901, the memory 902, and the auxiliary storage device 903 is referred to as a "processing circuitry".

"Unit" can be replaced with "processing" or "process". The function of a "unit" can be implemented by firmware.

The program for implementing the function of a "unit" can be stored in a non-volatile storage medium, such as a magnetic disc, an optical disc, or a flash memory.

Figure 3:
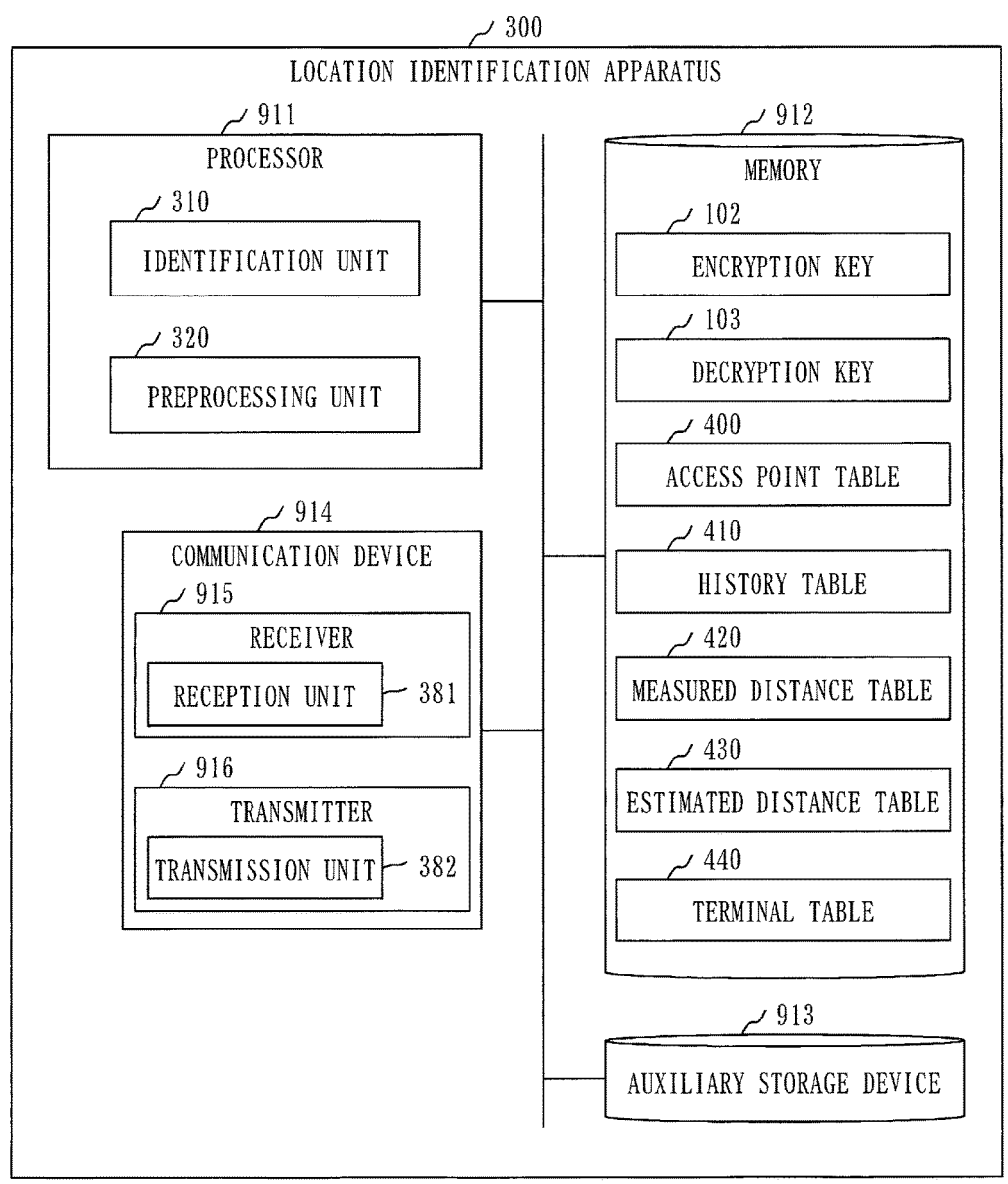
FIG. 3 is a configuration diagram of a location identification apparatus 300 in the embodiment 1.

A configuration of the location identification apparatus 300 is described based on FIG. 3.

The location identification apparatus 300 is a computer including hardware such as a processor 911, a memory 912, an auxiliary storage device 913, and a communication device 914. The processor 911 is connected to other hardware via a signal line.

The processor 911 is an IC which performs processing, and controls other hardware. More specifically, the processor 911 is a CPU, a DSP, or a GPU.

The memory 912 is a volatile storage device. The memory 912 is also called a main storage device or a main memory. More specifically, the memory 912 is a RAM.

The auxiliary storage device 913 is a non-volatile storage device. More specifically, the auxiliary storage device 913 is a ROM, an HDD, or a flash memory.

The communication device 914 includes a receiver 915 and a transmitter 916. More specifically, the communication device 914 is a communication chip or an NIC.

The location identification apparatus 300 includes, as elements of a functional configuration, "units" such as an identification unit 310 and a preprocessing unit 320. The function of a "unit" is implemented by software. The function of a "unit" is described below.

A program for implementing the function of a "unit" is stored in the auxiliary storage device 913. The program for implementing the function of a "unit" is loaded into the memory 912 and is then executed by the processor 911.

Moreover, an OS is stored in the auxiliary storage device 913. At least a part of the OS is loaded into the memory 912 and is then executed by the processor 911.

Thus, the processor 911 executes the program for implementing the function of a "unit" while executing the OS.

Data obtained by executing the program for implementing the function of a "unit" is stored in a storage device such as the memory 912, the auxiliary storage device 913, a register included in the processor 911, or a cache memory included in the processor 911. These storage devices function as a storage unit which stores data.

Furthermore, the location identification apparatus 300 can include a plurality of processors 911, and the plurality of processors 911 can execute the program for implementing the function of a "unit" in cooperation with each other.

Data to be used, generated, input or output, or transmitted or received by the location identification apparatus 300 is stored in the memory 912.

More specifically, for example, an encryption key 102, a decryption key 103, an access point table 400, a history table 410, a measured distance table 420, an estimated distance table 430, and a terminal table 440 are stored in the memory 912. The content of each piece of data to be stored in the memory 912 is described below.

The communication device 914 functions as a communication unit which communicates data, the receiver 915 functions as a reception unit 381 which receives data, and the transmitter 916 functions as a transmission unit 382 which transmits data.

Hardware obtained by integrating the processor 911, the memory 912, and the auxiliary storage device 913 is referred to as a "processing circuitry".

"Unit" can be replaced with "processing" or "process". The function of a "unit" can be implemented by firmware.

The program for implementing the function of a "unit" can be stored in a non-volatile storage medium, such as a magnetic disc, an optical disc, or a flash memory.

———Description of Operation———

Operations of the location identification system 100 and the location identification apparatus 300 are equivalent to a location identification method, and an operation of the communication terminal 200 is equivalent to a communication method.

Moreover, the location identification method is equivalent to a location identification program, and the communication method is equivalent to a communication program.

Figure 4:
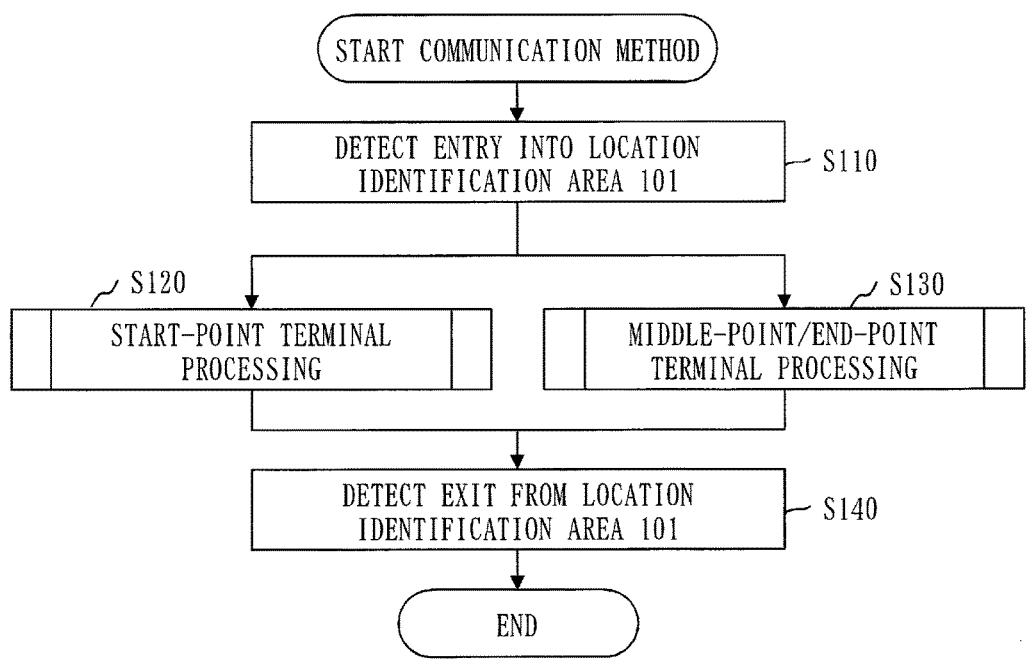
FIG. 4 is a flowchart of a communication method in the embodiment 1.

The communication method, which is equivalent to the operation of the communication terminal 200, is described based on FIG. 4.

Step S110 is entry detection processing.

In step S110, the detection unit 210 detects entry into the location identification area 101.

More specifically, an area signal for issuing a notification indicating being present in the location identification area 101 or near the location identification area 101 is periodically broadcast from the access point 110 or a transmitter provided in the location identification area 101. Then, in a case where the area signal has been received by the reception unit 281, the detection unit 210 determines entry into the location identification area 101.

Step S120 is start-point terminal processing, in which the communication terminal 200 operates as a start-point terminal. The start-point terminal is a communication terminal 200 which generates a distance packet 120 and transmits the distance packet 120 to surrounding communication terminals 200. The distance packet 120 is described below.

The start-point terminal processing (S120) is performed from when entry into the location identification area 101 is detected until exit from the location identification area 101 is detected. Details of the start-point terminal processing (S120) are described below.

Step S130 is middle-point/end-point terminal processing, in which the communication terminal 200 operates as a middle-point terminal or an end-point terminal. The middle-point terminal is a communication terminal 200 which receives the distance packet 120 and transfers the distance packet 120 to surrounding communication terminals 200. The end-point terminal is a communication terminal 200 which receives the distance packet 120 and transmits the distance packet 120 to the location identification apparatus 300. The distance packet 120 is described below.

The middle-point/end-point terminal processing (S130) is performed from when entry into the location identification area 101 is detected until exit from the location identification area 101 is detected. Details of the middle-point/end-point terminal processing (S130) are described below.

Step S140 is exit detection processing.

In step S140, the detection unit 210 detects exit from the location identification area 101.

More specifically, in a case where the area signal described in step S110 has become unreceivable by the reception unit 281, the detection unit 210 determines exit from the location identification area 101.

Figure 5:
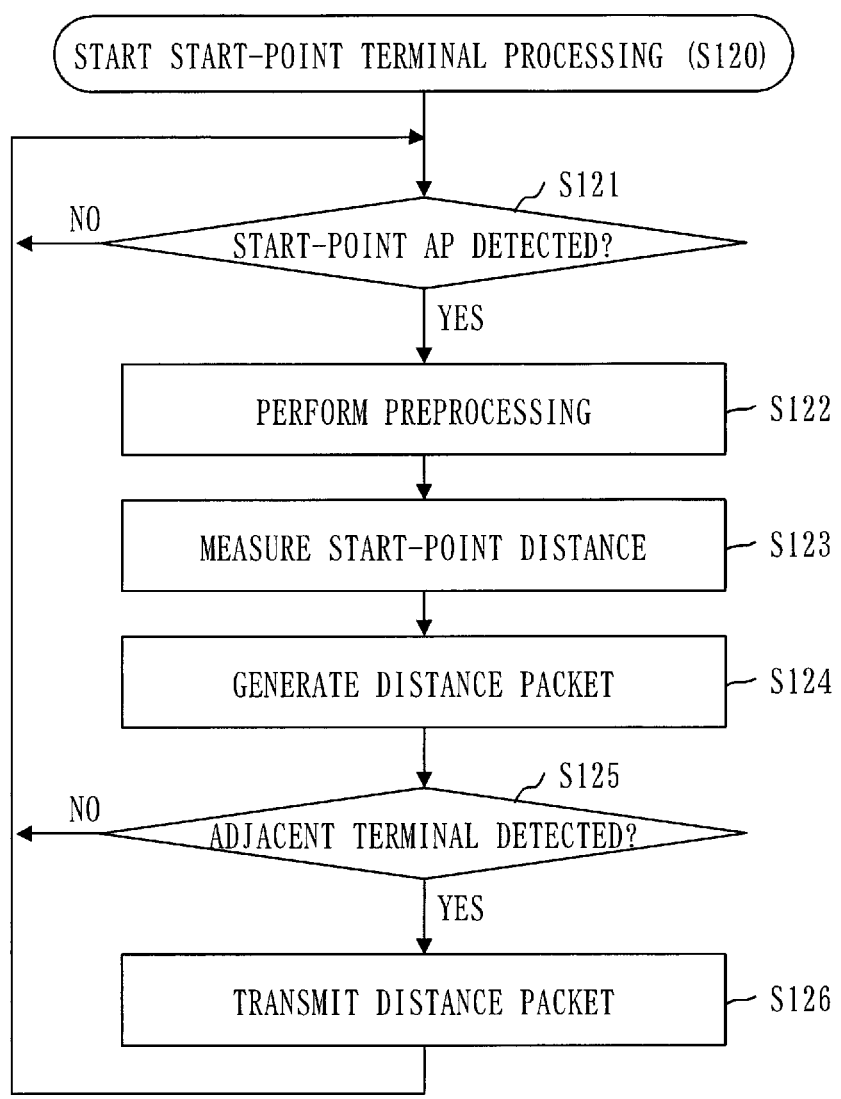
FIG. 5 is a flowchart of start-point terminal processing (S120) in the embodiment 1.

The start-point terminal processing (S120) is described based on FIG. 5.

Step S121 is start-point point detection processing.

In step S121, the detection unit 210 performs detection of the access point 110.

More specifically, the access point 110 periodically broadcasts a point signal including a point identifier by WiFi (registered trademark). Then, in a case where the point signal has been received by the reception unit 281, the detection unit 210 determines that the access point 110 has been detected.

The access point 110 detected in step S121 is referred to as a start-point point or a start-point access point. In FIG. 5 and other figures, AP denotes an access point.

In a case where the start-point point has been detected, processing proceeds to step S122.

Step S122 is preprocessing.

In step S122, preprocessing such as described below is performed.

First, the preprocessing unit 250 generates a start request packet 130. The content of the start request packet 130 is described below.

Next, the transmission unit 282 transmits the start request packet 130 to the location identification apparatus 300 via the start-point point.

Then, the reception unit 281 receives a start response packet 140 transmitted from the location identification apparatus 300 via the start-point point. The content of the start response packet 140 is described below.

Figure 6:
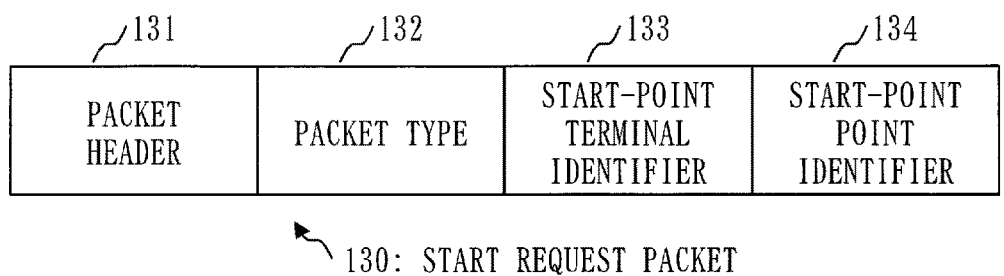
FIG. 6 is a configuration diagram of a start request packet 130 in the embodiment 1.

The start request packet 130 is described based on FIG. 6.

The start request packet 130 is a packet including a packet header 131, a packet type 132, a start-point terminal identifier 133, and a start-point point identifier 134. More specifically, the start request packet 130 is a TCP/IP packet. TCP is an abbreviation for Transmission Control Protocol, and IP is an abbreviation for Internet Protocol.

The packet header 131 is a header of the start request packet 130. More specifically, the packet header 131 is a header of the TCP/IP packet.

The packet type 132 is an identifier denoting the start request packet 130. The packet type 132 is previously stored in the memory 902.

The start-point terminal identifier 133 is an identifier identifying a start-point terminal. The start-point terminal is a communication terminal 200 which serves as a transmission source of the start request packet 130. The start-point terminal identifier 133 is previously stored in the memory 902.

The start-point point identifier 134 is an identifier identifying a start-point point. The start-point point is an access point detected by the start-point terminal. The start-point point identifier 134 is obtained from a point signal received when the start-point point has been detected.

Figure 7:
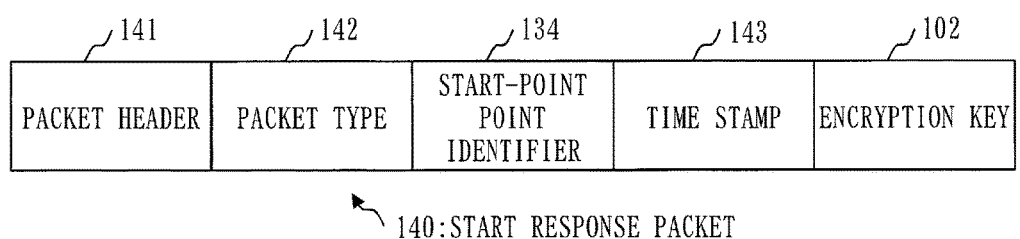
FIG. 7 is a configuration diagram of a start response packet 140 in the embodiment 1.

The start response packet 140 is described based on FIG. 7.

The start response packet 140 is a packet including a packet header 141, a packet type 142, a start-point point identifier 134, a time stamp 143, and an encryption key 102. More specifically, the start response packet 140 is a TCP/IP packet.

The packet header 141 is a header of the start response packet 140. More specifically, the packet header 141 is a header of the TCP/IP packet.

The packet type 142 is an identifier denoting the start response packet 140.

The start-point point identifier 134 is an identifier identifying a start-point point.

The time stamp 143 is time at which generation of the start response packet 140 was performed.

The encryption key 102 is a value to be used for encryption of data.

Referring back to FIG. 5, the description proceeds from step S123.

Step S123 is start-point distance measurement processing.

In step S123, the measurement unit 220 measures a distance between the self-terminal and the start-point point.

More specifically, the measurement unit 220 measures a distance between the self-terminal and the start-point point using the intensity of radio waves broadcast from the start-point point. In this case, the measurement unit 220 acquires, from the reception unit 381, the radio field intensity of carrier waves carrying the start response packet 140, and performs an arithmetic operation on a distance function using the acquired radio field intensity as an input. With this, the distance between the self-terminal and the start-point point is calculated. This distance function is a function for calculating the distance using the radio field intensity.

Furthermore, the measurement unit 220 can calculate a distance between the self-terminal and the start-point point using a time required for communication from the start-point point to the self-terminal. In this case, the measurement unit 220 acquires time of transmission of the start response packet 140 from the packet header 141, and acquires time of reception of the start response packet 140 from the reception unit 381. Then, the measurement unit 220 calculates a communication time from the time of transmission to the time of reception, and performs an arithmetic operation on a distance function using the calculated communication time as an input. With this, the distance between the self-terminal and the start-point point is calculated. This distance function is a function for calculating the distance using a communication time.

The distance measured in step S123 is referred to as a start-point distance.

Step S124 is generation processing.

In step S124, the generation unit 231 generates a distance packet 120 that is in an initial state.

More specifically, the generation unit 231 generates a distance packet 120 that is in an initial state by using the start-point distance, the packet type 142, the start-point point identifier 134, the time stamp 143, and the encryption key 102.

Figure 8:
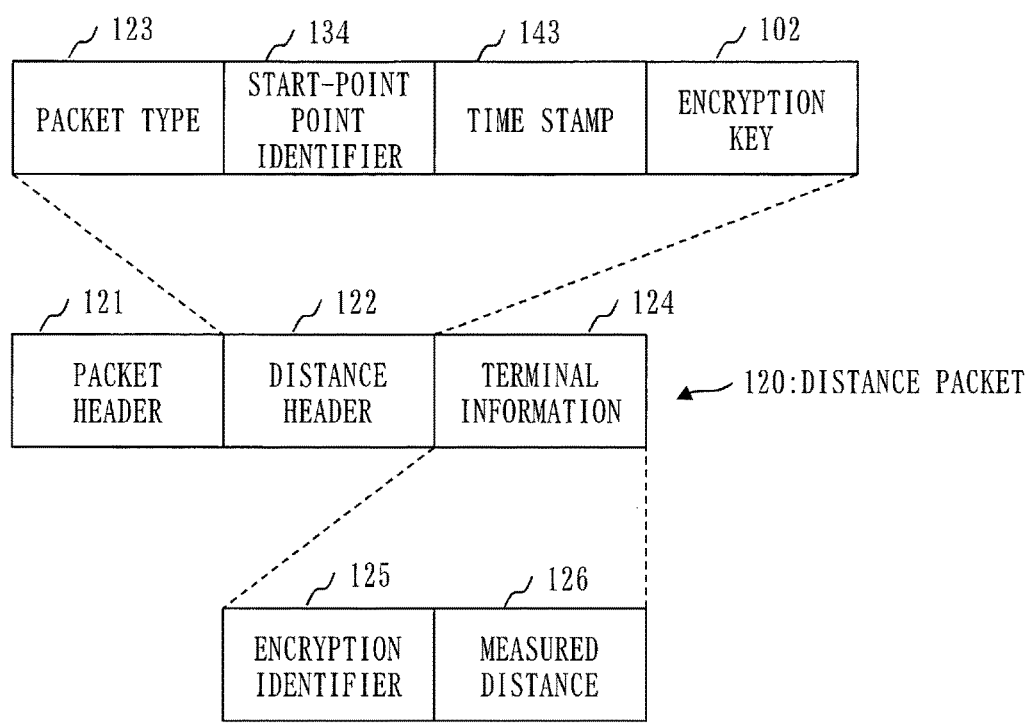
FIG. 8 is a configuration diagram of a distance packet 120 that is in an initial state in the embodiment 1.

The distance packet 120 that is in an initial state is described based on FIG. 8.

The distance packet 120 that is in an initial state is a packet which includes a packet header 121, a distance header 122, and terminal information 124. More specifically, the distance packet 120 is a TCP/IP packet.

The packet header 121 is a header of the distance packet 120. More specifically, the packet header 121 is a header of the TCP/IP packet.

The distance header 122 includes a packet type 123, the start-point point identifier 134, the time stamp 143, and the encryption key 102.

The packet type 123 is an identifier which denotes the distance packet 120. The packet type 123 is previously stored in the memory 902.

The start-point point identifier 134, the time stamp 143, and the encryption key 102 are information that is obtained from the start response packet 140.

The terminal information 124 includes an encryption identifier 125 and a measured distance 126.

The encryption identifier 125 is a terminal identifier encrypted with use of the encryption key 102. More specifically, the encryption identifier 125, which is included in the distance packet 120 that is in an initial state, is the start-point terminal identifier 133 encrypted with use of the encryption key 102.

The measured distance 126 is information indicating a distance obtained by measurement. More specifically, the measured distance 126, which is included in the distance packet 120 that is in an initial state, is a start-point distance. The start-point distance is the distance between a start-point terminal and a start-point point.

Referring back to FIG. 5, the description proceeds from step S125.

Step S125 is adjacent terminal detection processing.

In step S125, the detection unit 210 detects an adjacent terminal. The adjacent terminal is a communication terminal 200 present around the self-terminal.

More specifically, the communication terminal 200 periodically broadcasts a terminal signal including a terminal identifier using Bluetooth (registered trademark). Then, when the terminal signal has been received by the reception unit 281, the detection unit 210 determines that the adjacent terminal has been detected.

If the adjacent terminal has been detected, processing proceeds to S126.

Step S126 is transmission processing.

In step S126, the transmission unit 282 transmits the distance packet 120 that is in an initial state to the adjacent terminal. In other words, the transmission unit 282 transmits the distance packet 120 including a start-point distance to the adjacent terminal.

More specifically, the transmission unit 282 transmits the distance packet 120 using Bluetooth (registered trademark). This distance packet 120 is received by the adjacent terminal.

Figure 9:
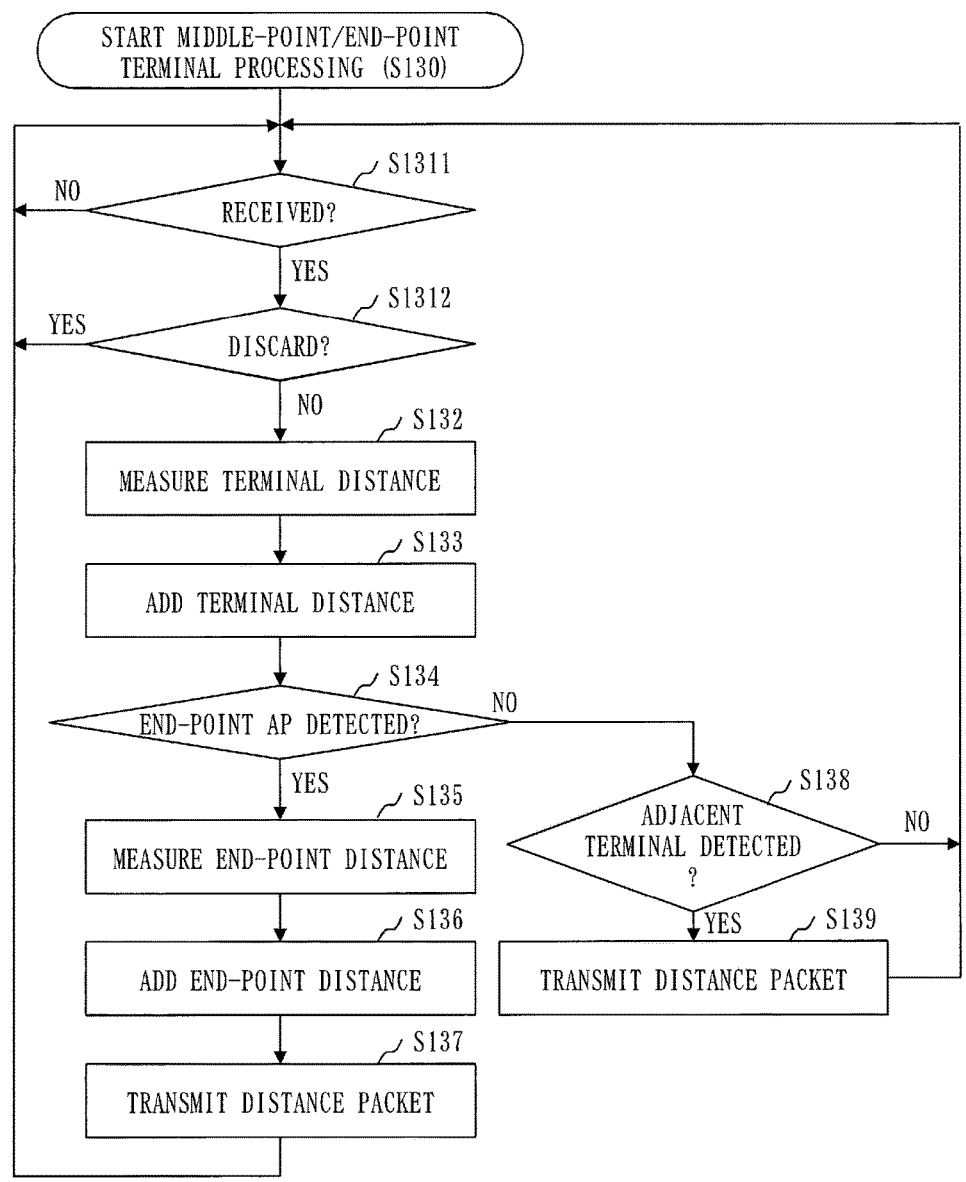
FIG. 9 is a flowchart of middle-point/end-point terminal processing (S130) in the embodiment 1.

The middle-point/end-point terminal processing (S130) is described based on FIG. 9.

Step S1311 is reception processing.

In step S1311, when the adjacent terminal has transmitted the distance packet 120, the reception unit 281 receives the distance packet 120.

The distance packet 120 to be received is a distance packet 120 that is in an initial state or a distance packet 120 that is in a halfway state. The distance packet 120 that is in a halfway state is described below.

If the distance packet 120 has been received, processing proceeds to step S1312.

Figure 10:
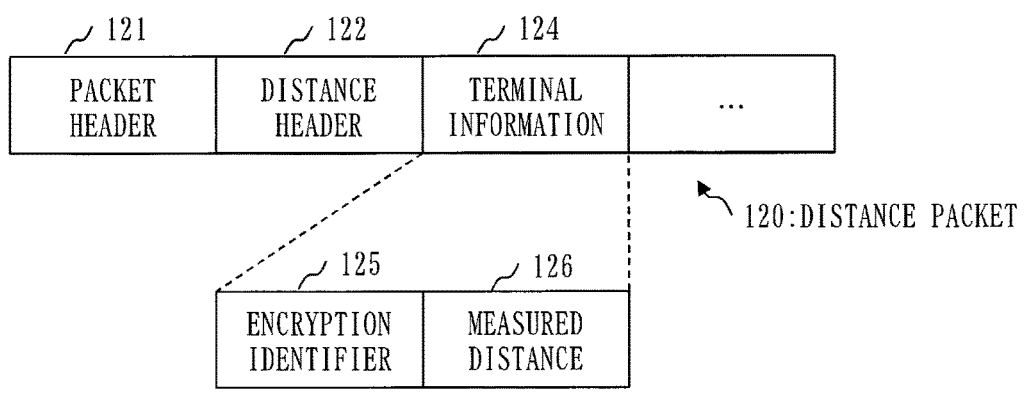
FIG. 10 is a configuration diagram of a distance packet 120 that is in a halfway state in the embodiment 1.

The distance packet 120 that is in a halfway state is described based on FIG. 10.

The distance packet 120 that is in a halfway state is a packet which includes a packet header 121, a distance header 122, and a plurality of pieces of terminal information 124.

The packet header 121, the distance header 122, and the first terminal information 124 are information which is included in the distance packet 120 that is in an initial state.

The encryption identifier 125 and the measured distance 126 which are included in the n-th terminal information 124 are referred to as the n-th encryption identifier 125 and the n-th measured distance 126. n is an integer of 2 or greater and N or less. N is the number of pieces of terminal information 124 included in the distance packet 120.

The n-th encryption identifier 125 is the n-th terminal identifier encrypted. The n-th terminal identifier is an identifier for identifying the n-th communication terminal 200.

The n-th measured distance 126 is the n-th terminal distance. The n-th terminal distance is the distance between the n-th communication terminal 200 and the (n−1)-th communication terminal 200.

Referring back to FIG. 9, the description proceeds from S1312.

Step S1312 is discard processing.

In step S1312, the discard unit 240 determines whether the received distance packet 120 satisfies a discard condition. The distance packet 120 satisfying the discard condition is a packet which has followed a redundant path and is, therefore, a packet which is unnecessary for the location identification system 100, which requires the shortest path.

More specifically, the discard unit 240 acquires the encryption key 102 from the received distance packet 120, and encrypts a self-terminal identifier using the encryption key 102. Then, the discard unit 240 determines whether the same encryption identifier 125 as the encrypted self-terminal identifier is included in the received distance packet 120. The distance packet 120 including the same encryption identifier 125 as the encrypted self-terminal identifier satisfies the discard condition. The self-terminal identifier is previously stored in the memory 902.

If the received distance packet 120 satisfies the discard condition, the discard unit 240 discards the received distance packet 120.

If the received distance packet 120 does not satisfy the discard condition, processing proceeds to step S132.

Step S132 is terminal distance measurement processing.

In step S132, the measurement unit 220 measures the distance between the self-terminal and the adjacent terminal. In other words, the measurement unit 220 measures the distance to a communication terminal 200 that is a transmission source of the received distance packet 120.

More specifically, the measurement unit 220 calculates the distance between the self-terminal and the adjacent terminal using the intensity of radio waves broadcast by the adjacent terminal. In this case, the measurement unit 220 acquires, from the reception unit 381, the radio field intensity of carry waves which carry the distance packet 120, and calculates a distance function with the acquired radio field intensity used as an input. With this, the distance between the self-terminal and the adjacent terminal is calculated. This distance function is a function for calculating a distance using the radio field intensity.

Moreover, the measurement unit 220 can calculate the distance between the self-terminal and the adjacent terminal using a communication time from the adjacent terminal to the self-terminal. In this case, the measurement unit 220 acquires the time of transmission of the distance packet 120 from the packet header 121, and acquires the time of reception of the distance packet 120 from the reception unit 381. Then, the measurement unit 220 calculates a communication time from the time of transmission to the time of reception, and calculates a distance function with the calculated communication time used as an input. With this, the distance between the self-terminal and the adjacent terminal is calculated. This distance function is a function for calculating a distance using the communication time.

The distance measured in step S132 is referred to as a new terminal distance.

Step S133 is terminal distance addition processing.

In step S133, the addition unit 232 adds the new terminal distance to the received distance packet 120.

More specifically, the addition unit 232 acquires the encryption key 102 from the received distance packet 120, and encrypts the self-terminal identifier using the encryption key 102. Then, the addition unit 232 adds the terminal information 124, which includes the encrypted self-terminal identifier as the encryption identifier 125 and includes the new terminal distance as the measured distance 126, to the received distance packet 120.

Step S134 is end-point point detection processing.

In step S134, the detection unit 210 detects the access points 110. The detection method is the same as that in step S121.

Out of the access points 110 detected in step S134, an access point 110 different from an access point 110 identified by the start-point point identifier 134 included in the received distance packet 120 is referred to as an end-point point or an end-point access point.

If the end-point point has been detected, processing proceeds to step S135.

If the end-point point has not been detected, processing proceeds to step S138.

Step S135 is end-point distance measurement processing.

In step S135, the measurement unit 220 measures the distance between the self-terminal and the end-point point. The measurement method is the same as that in step S123.

The distance measured in step S135 is referred to as an end-point distance.

Step S136 is end-point distance addition processing.

In step S136, the addition unit 232 adds the measured end-point distance to the distance packet 120 having the terminal distance added thereto.

More specifically, the addition unit 232 generates a distance footer 127 including the end-point distance as the measured distance 126, and adds the distance footer 127 to the distance packet 120 having the terminal distance added thereto.

With step S136, a distance packet 120 that is in a final state is generated.

Figure 11:
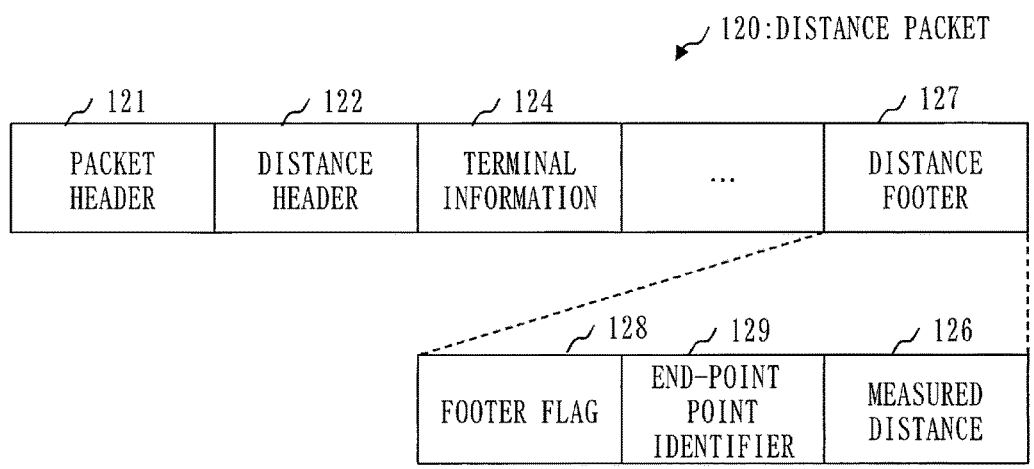
FIG. 11 is a configuration diagram of a distance packet 120 that is in a final state in the embodiment 1.

The distance packet 120 that is in a final state is described based on FIG. 11.

The distance packet 120 that is in a final state is a packet which includes a packet header 121, a distance header 122, and one or more pieces of terminal information 124.

The packet header 121, the distance header 122, and the terminal information 124 are information included in the distance packet 120 that is in an initial state or the distance packet 120 that is in a halfway state.

The distance footer 127 includes a footer flag 128, an end-point point identifier 129, and a measured distance 126.

The footer flag 128 is a flag value located at the head of the distance footer 127.

The end-point point identifier 129 is an identifier for identifying an end-point point. The end-point point is an access point 110 detected by the end-point terminal.

The measured distance 126 included in the distance footer 127 is an end-point distance. The end-point distance is the distance between the end-point terminal and the end-point point.

Referring back to FIG. 9, the description proceeds from step S137.

Step S137 is transmission processing.

In step S137, the transmission unit 282 transmits the distance packet 120 that is in a final state to the location identification apparatus 300 via the end-point point. In other words, the transmission unit 282 transmits the distance packet 120 having the new terminal distance and the end-point distance added thereto to the location identification apparatus 300 via the end-point point.

Step S138 is adjacent terminal detection processing.

In step S138, the detection unit 210 detects an adjacent terminal. The detection method is the same as that in step S125.

If one or more adjacent terminals have been detected, processing proceeds to step S139.

Step S139 is transfer processing.

In step S139, the transmission unit 282 transmits the distance packet 120 that is in a halfway state to the adjacent terminal. In other words, the transmission unit 282 transmits the distance packet 120 having the new terminal distance added thereto to the adjacent terminal.

Figure 12:
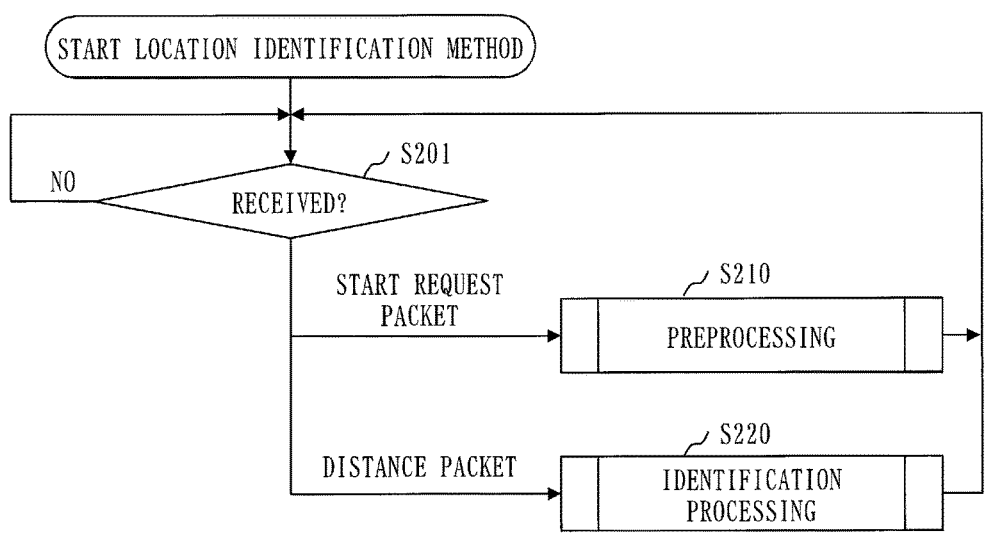
FIG. 12 is a flowchart of a location identification method in the embodiment 1.

The location identification method corresponding to the operation of the location identification apparatus 300 is described based on FIG. 12.

Step S201 is reception processing.

In step S201, when the start request packet 130 has been transmitted from the start-point terminal, the reception unit 381 receives the start request packet 130 via the start-point point. If the packet type 132 included in the received packet is an identifier denoting the start request packet 130, the preprocessing unit 320 determines that the start request packet 130 has been received.

Moreover, when the distance packet 120 that is in a final state has been transmitted from the end-point terminal, the reception unit 381 receives the distance packet 120 that is in a final state via the end-point point. If the packet type 123 included in the received packet is an identifier denoting the distance packet 120, the identification unit 310 determines that the distance packet 120 has been received.

If the start request packet 130 has been received, processing proceeds to step S210.

If the distance packet 120 that is in a final state has been received, processing proceeds to step S220.

Figure 13:
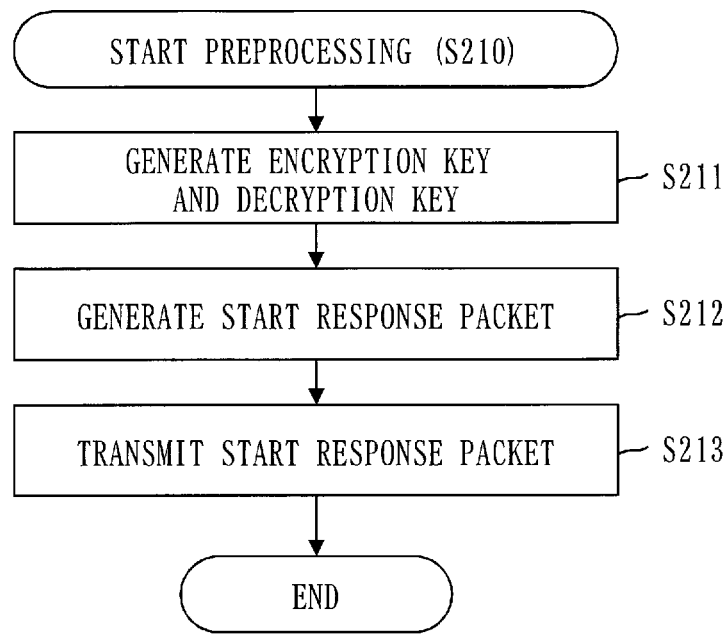
FIG. 13 is a flowchart of preprocessing (S210) in the embodiment 1.

Preprocessing (S210) is described based on FIG. 13.

In step S211, the preprocessing unit 320 generates a set of an encryption key 102 and a decryption key 103. The encryption key 102 is a value used for encryption of data, and the decryption key 103 is a value used for decryption of data encrypted by using the encryption key 102. More specifically, the encryption key 102 is a public key in a public key encryption system, and the decryption key 103 is a private key in the public key encryption system.

However, in a case where the encryption key 102 and the decryption key 103 have already been generated, the preprocessing unit 320 does not need to generate a new encryption key 102 and a new decryption key 103.

Furthermore, the encryption key 102 and the decryption key 103 can be generated beforehand.

In step S212, the preprocessing unit 320 generates the start response packet 140.

More specifically, the preprocessing unit 320 generates the packet header 141 and the time stamp 143. Then, the preprocessing unit 320 generates the start response packet 140 using the packet header 141, the packet type 142, the start-point point identifier 134, the time stamp 143, and the encryption key 102. The packet type 142 is previously stored in the memory 912. The start-point point identifier 134 is acquired from the start request packet 130.

In step S213, the transmission unit 382 transmits the start response packet 140 to the start-point terminal via the start-point point.

Figure 14:
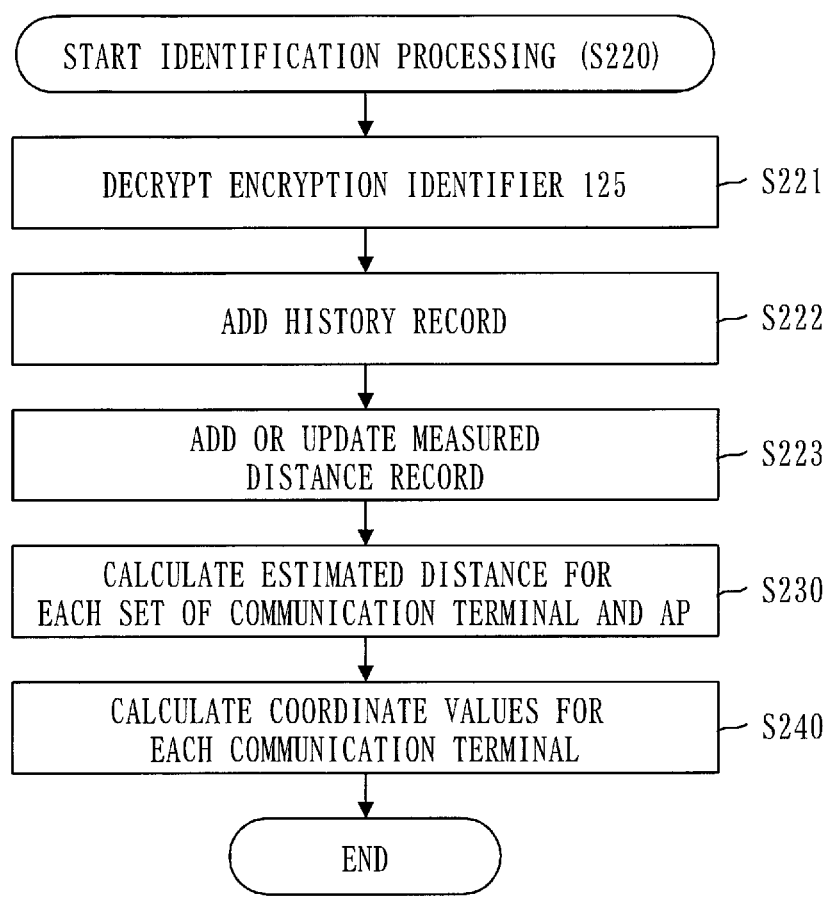
FIG. 14 is a flowchart of identification processing (S220) in the embodiment 1.

Identification processing (S220) is described based on FIG. 14.

In step S221, the identification unit 310 decrypts the encryption identifier 125 included in the terminal information 124 using the decryption key 103 for each piece of terminal information 124 included in the distance packet 120. With this, a terminal identifier is acquired for each piece of terminal information 124.

In step S222, the identification unit 310 generates a history record using the start-point point identifier 134 and the time stamp 143 which are included in the distance packet 120. The history record is a record in the history table 410.

Then, the identification unit 310 adds the generated history record to the history table 410.

However, if a history record that matches the start-point point identifier 134 and the time stamp 143 exists in the history table 410, the identification unit 310 does not perform generation and addition of a history record.

The history table 410 is described based on FIG. 15.

The history table 410 includes a column of history identifiers 411 and a column of the time stamps 143.

The history identifier 411 is an identifier for identifying a history record, and is generated by a serial number assigned for each start-point point identifier 134 being appended to the start-point point identifier 134.

The time stamp 143 is information which is obtained from the distance packet 120.

Referring back to FIG. 14, the description proceeds from step S223.

In step S223, the identification unit 310 generates a measured distance record for each piece of terminal information 124 and each distance footer 127 which are included in the distance packet 120. The measured distance record is a record for the measured distance table 420.

Then, the identification unit 310 adds the generated measured distance record to the measured distance table 420.

More specifically, the identification unit 310 generates a measured distance table 420 for each history identifier 411 so as to distinguish between measured distances 126 acquired at respective different time periods. Next, the identification unit 310 generates a measured distance record for each piece of terminal information 124 and each distance footer 127 which are included in each of distance packets 120 in which the same history identifier 411 is included. Then, the identification unit 310 adds the generated measured distance record to the measured distance table 420 corresponding to the same history identifier 411.

However, if a measured distance record corresponding to the terminal information 124 or the distance footer 127 exists in the measured distance table 420, the identification unit 310 does not perform generation and addition of a measured distance record. Then, if the measured distance 126 included in the terminal information 124 or the distance footer 127 is shorter than the measured distance 126 included in the corresponding measured distance record, the identification unit 310 updates the measured distance 126 included in the corresponding measured distance record to the measured distance 126 included in the terminal information 124 or the distance footer 127.

The measured distance table 420 is described based on FIG. 16 and FIG. 17.

The measured distance table 420 includes a column of first identifiers 421, a column of second identifiers 422, a column of the measured distances 126, and a column of the history identifiers 411.

The first identifier 421 is an identifier for identifying one end point of an interval provided by the measured distance 126. In a measured distance record corresponding to the first terminal information 124 included in the distance packet 120, the first identifier 421 is the start-point point identifier 134 included in the distance header 122. In a measured distance record corresponding to the n-th terminal information 124 included in the distance packet 120, the first identifier 421 is the (n−1)-th terminal identifier. The (n−1)-th terminal identifier is a terminal identifier obtained by decrypting the encryption identifier 125 included in the (n−1)-th terminal information 124. n is an integer of 2 or greater and N or less. N is the number of pieces of terminal information 124 included in the distance packet 120. In a measured distance record corresponding to the distance footer 127 included in the distance packet 120, the first identifier 421 is the N-th terminal identifier. The N-th terminal identifier is a terminal identifier obtained by decrypting the encryption identifier 125 included in the N-th terminal information 124.

The second identifier 422 is an identifier for identifying the other end point of the interval provided by the measured distance 126. In a measured distance record corresponding to the m-th terminal information 124 included in the distance packet 120, the second identifier 422 is the m-th terminal identifier. The m-th terminal identifier is a terminal identifier obtained by decrypting the encryption identifier 125 included in the m-th terminal information 124. m is an integer of 1 or greater and N or less. In a measured distance record corresponding to the distance footer 127 included in the distance packet 120, the second identifier 422 is the end-point point identifier 129 included in the distance footer 127.

The measured distance 126 is information obtained from the terminal information 124 or the distance footer 127 included in the distance packet 120. In other words, the measured distance 126 is a start-point distance, a terminal distance, or an end-point distance.

The history identifier 411 is information obtained from a history record corresponding to the distance packet 120.

Figure 18:
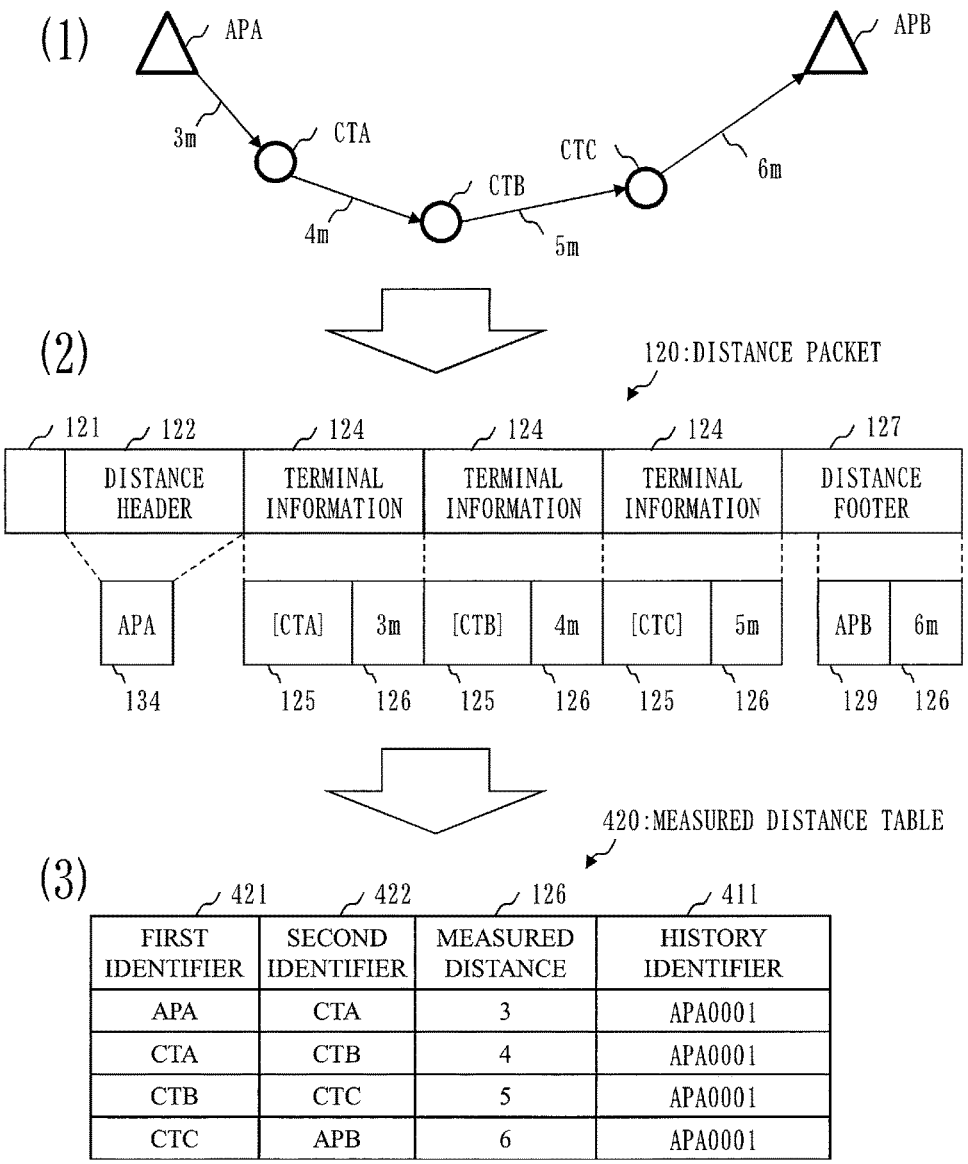
FIG. 18 is a diagram illustrating a specific example of the measured distance table 420 in the embodiment 1.

A specific example of the measured distance table 420 is described based on FIG. 18.

In FIG. 18, when a start-point point APA, a start-point terminal CTA, a middle-point terminal CTB, an end-point terminal CTC, and an end-point point APB are in a relationship illustrated in (1), a distance packet 120 illustrated in (2) is obtained. Then, a measured distance table 420 illustrated in (3) is generated based on the distance packet 120 illustrated in (2).

Referring back to FIG. 14, the description proceeds from step S230.

Step S230 is distance calculation processing.

In step S230, the identification unit 310 calculates an estimated distance between each communication terminal 200 and each access point 110 using the start-point distance, the terminal distance, and the end-point distance which are included in the received distance packet 120. The estimated distance is a distance obtained by making a rough estimate.

More specifically, the identification unit 310 finds the shortest path from the communication terminal 200 to the access point 110 using the measured distance table 420. Then, the identification unit 310 sums measured distances 126 of intervals included in the shortest path. The specific method for finding the shortest path is Dijkstra's algorithm.

Details of distance calculation processing (S230) for calculating the estimated distance using Dijkstra's algorithm are described below.

Step S240 is coordinate value calculation processing.

In step S240, the identification unit 310 calculates the coordinate values of each communication terminal 200 using each calculated estimated distance and the coordinate values of each access point 110.

Details of the coordinate value calculation processing (S240) are described below.

Figure 19:
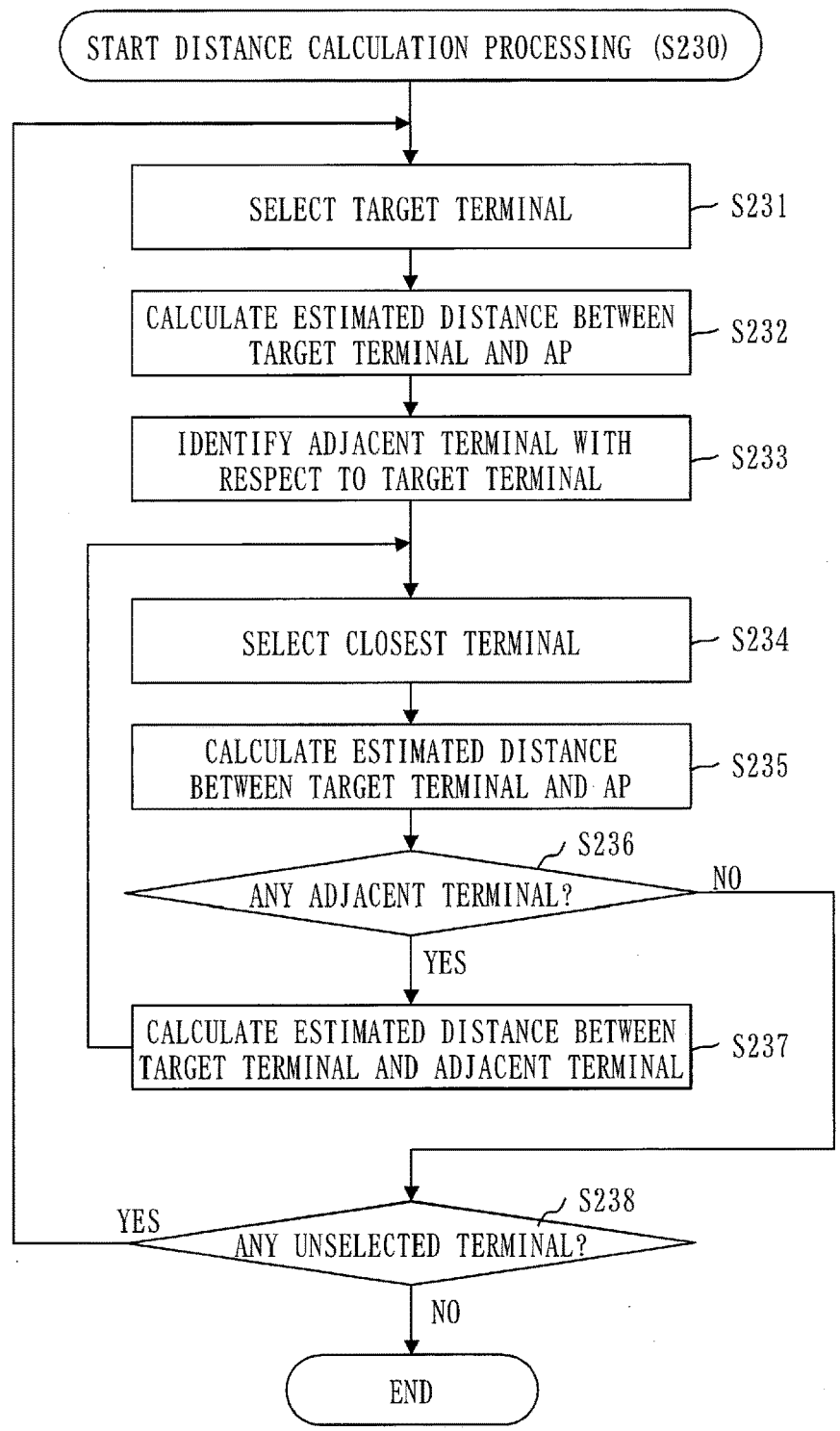
FIG. 19 is a flowchart of distance calculation processing (S230) in the embodiment 1.

The distance calculation processing (S230) is described based on FIG. 19.

In step S231, the identification unit 310 selects a target terminal from unselected communication terminals 200.

More specifically, the identification unit 310 selects one of unselected terminal identifiers from the measured distance table 420. A communication terminal 200 identified by the selected terminal identifier is the target terminal. Terminal identifiers are discriminated from the identifier of the access point 110 based on a rule of identifiers.

In step S232, the identification unit 310 calculates an estimated distance between the target terminal and the access point 110.

More specifically, the identification unit 310 extracts the measured distance 126 associated with the identifier of the target terminal and the identifier of the access point 110 from the measured distance table 420. The extracted measured distance 126 is the estimated distance. The identifier of the access point 110 is discriminated from the terminal identifiers based on a rule of identifiers.

Then, the identification unit 310 registers the estimated distance with the estimated distance table 430 while associating the estimated distance with the identifier of the target terminal and the identifier of the access point 110. The estimated distance table 430 is described below.

In step S233, the identification unit 310 identifies an adjacent terminal with respect to the target terminal.

More specifically, the identification unit 310 extracts a terminal identifier and a measured distance 126 which are associated with the identifier of the target terminal from the measured distance table 420. A communication terminal 200 identified by the extracted terminal identifier is the adjacent terminal with respect to the target terminal.

When the identifier of the target terminal is CTj and the identifiers of adjacent terminals with respect to the target terminal are CTh, CTi, CTk, CTn, and CTm, a first working table 451 such as that illustrated in (1) of FIG. 20 is obtained. The first working table 451 is generated by the identification unit 310.

In step S234, the identification unit 310 selects the closest terminal from the adjacent terminals identified in step S233.

More specifically, the identification unit 310 selects the shortest distance from the first working table 451, and selects the identifier of an adjacent terminal associated with the selected distance. An adjacent terminal identified by the selected identifier is the closest terminal.

In the first working table 451 illustrated in (1) of FIG. 20, the shortest distance is 2. Accordingly, the adjacent terminal CTi is selected as the closest terminal.

In step S235, the identification unit 310 calculates an estimated distance between the target terminal and the access point 110.

More specifically, the identification unit 310 extracts a distance associated with the identifier of the target terminal and the identifier of the closest terminal from the first working table 451. Moreover, the identification unit 310 extracts the measured distance 126 associated with the identifier of the closest terminal and the identifier of the access point 110 from the measured distance table 420. Then, the identification unit 310 calculates the sum of the distance extracted from the first working table 451 and the measured distance 126 extracted from the measured distance table 420. The calculated sum is the estimated distance between the target terminal and the access point 110.

Then, the identification unit 310 registers the estimated distance with the estimated distance table 430 while associating the estimated distance with the identifier of the target terminal and the identifier of the access point 110. The estimated distance table 430 is described below.

In step S236, the identification unit 310 identifies an adjacent terminal with respect to the closest terminal except the communication terminal 200 selected as the target terminal or the closest terminal.

More specifically, the identification unit 310 extracts a terminal identifier and a measured distance 126 which are associated with the identifier of the closest terminal from the measured distance table 420. However, the identifier of the communication terminal 200 selected as the target terminal or the closest terminal and the measured distance 126 associated with that identifier are excluded. The communication terminal 200 identified by the extracted terminal identifier is the adjacent terminal with respect to the closest terminal.

When the identifier of the closest terminal is CTi and the identifiers of the adjacent terminals with respect to the closest terminal are CTh, CTf, CTg, and CTk, a second working table 452 such as that illustrated in (2) of FIG. 20 is obtained. The second working table 452 is generated by the identification unit 310.

If there is an adjacent terminal with respect to the closest terminal except the communication terminal 200 selected as the target terminal or the closest terminal, processing proceeds to S237.

If there is no adjacent terminal with respect to the closest terminal except the communication terminal 200 selected as the target terminal or the closest terminal, processing proceeds to S238.

In step S237, the identification unit 310 calculates an estimated distance between the target terminal and the adjacent terminal with respect to the closest terminal.

More specifically, the identification unit 310 extracts a distance associated with the identifier of the target terminal and the identifier of the closest terminal from the first working table 451. Moreover, the identification unit 310 extracts a distance associated with the identifier of the closest terminal and the identifier of the adjacent terminal with respect to the closest terminal from the second working table 452. Then, the identification unit 310 calculates the sum of the distance extracted from the first working table 451 and the distance extracted from the second working table 452. The calculated sum is the estimated distance between the target terminal and the adjacent terminal with respect to the closest terminal.

A third working table 453 illustrated in (3) of FIG. 20 is generated with use of the first working table 451 illustrated in (1) of FIG. 20 and the second working table 452 illustrated in (2) of FIG. 20. The third working table 453 is generated by the identification unit 310.

Furthermore, merging the first working table 451 illustrated in (1) of FIG. 20 with the third working table 453 illustrated in (3) of FIG. 20 causes the first working table 451 to be updated as illustrated in (4) of FIG. 20. However, if records including the identifier of the same adjacent terminal exist in the first working table 451 and the third working table 453, one of the records having the shorter distance associated with that identifier is employed. Thus, while the record having the shorter distance remains in the first working table 451 after updating, the record having the longer distance does not remain in the first working table 451 after updating. Moreover, records including the identifier of the closest terminal are deleted from the first working table 451. The first working table 451 is updated by the identification unit 310.

After step S237, processing returns to step S234.

Upon processing returning to step S234, the identification unit 310 selects the closest terminal from the adjacent terminals identified in step S236.

More specifically, the identification unit 310 selects the shortest distance from the first working table 451 after updating, and selects the identifier of an adjacent terminal associated with the selected distance. The communication terminal 200 identified by the selected identifier is the closest terminal.

Figure 21:
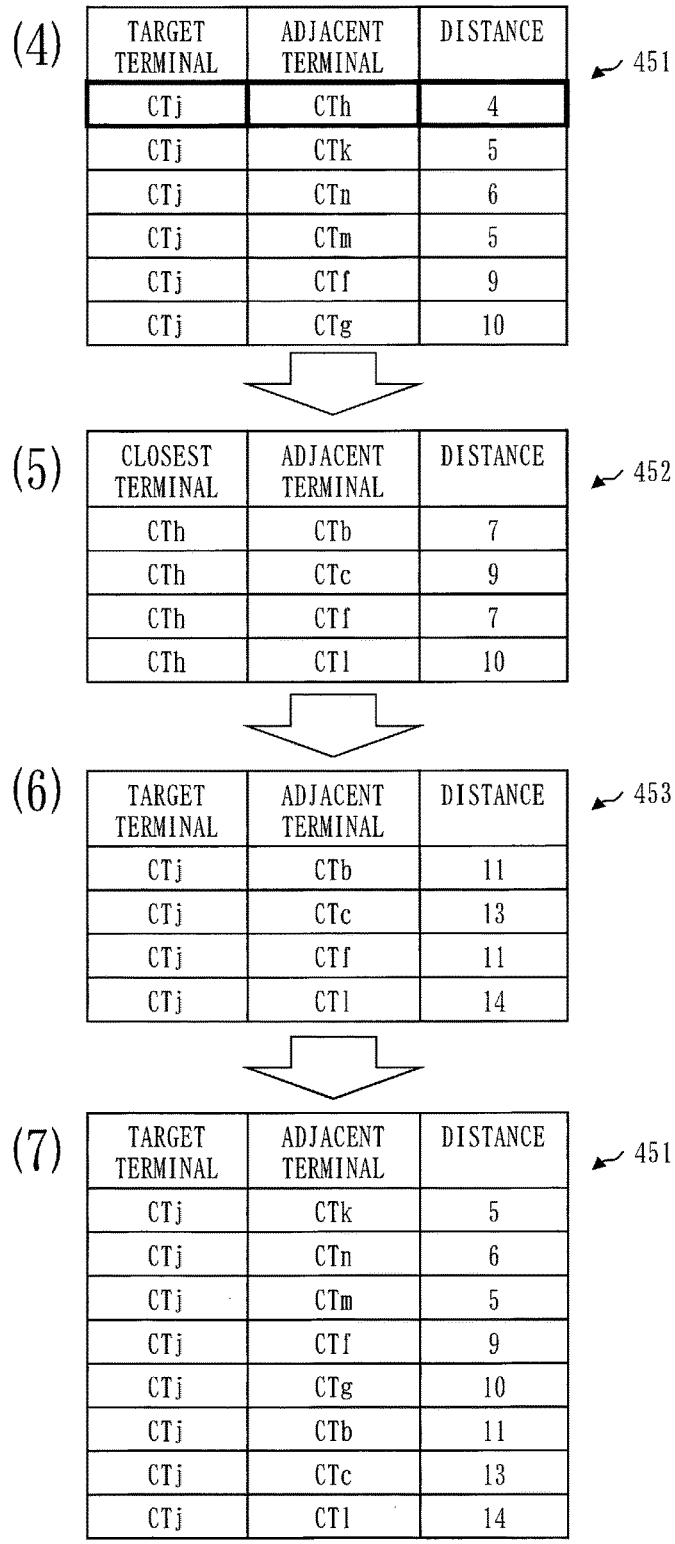
FIG. 21 is a diagram illustrating a specific example of the distance between the terminals in the embodiment 1.

In the first working table 451 illustrated in (4) of FIG. 21, the shortest distance is 4. Accordingly, the adjacent terminal CTh is selected as the closest terminal. The first working table 451 illustrated in (4) of FIG. 21 is the same as that illustrated in (4) of FIG. 20.

Step S235 to step S237 after step S234 are as described above.

In step S236, when the identifier of the closest terminal is CTh and the identifiers of the adjacent terminals with respect to the closest terminal are CTb, CTc, CTf, and CTl, a second working table 452 such as that illustrated in (5) of FIG. 21 is obtained.

In step S237, a third working table 453 illustrated in (6) of FIG. 21 is generated with use of the first working table 451 illustrated in (4) of FIG. 21 and the second working table 452 illustrated in (5) of FIG. 21. Furthermore, merging the first working table 451 illustrated in (4) of FIG. 21 with the third working table 453 illustrated in (6) of FIG. 21 causes the first working table 451 to be updated as illustrated in (7) of FIG. 21.

Referring back to FIG. 19, step S238 is described.

In step S238, the identification unit 310 determines whether there is an unselected communication terminal 200, which is not yet selected as the target terminal.

If there is an unselected communication terminal 200, processing returns to step S231.

If there is no unselected communication terminal 200, the distance calculation processing (S230) ends.

With the distance calculation processing (S230) performed, an estimated distance table 430 such as that illustrated in FIG. 22 is generated.

The estimated distance table 430 includes a column of terminal identifiers 431, a column of access point identifiers 432, a column of history identifiers 411, and a column of estimated distances 433.

The terminal identifier 431 is an identifier for identifying the communication terminal 200.

The access point identifier 432 is an identifier for identifying the access point 110.

The history identifier 411 is information obtained from the measured distance table 420.

The estimated distance 433 is an estimated distance calculated in step S232 or step S235.

Figure 23:
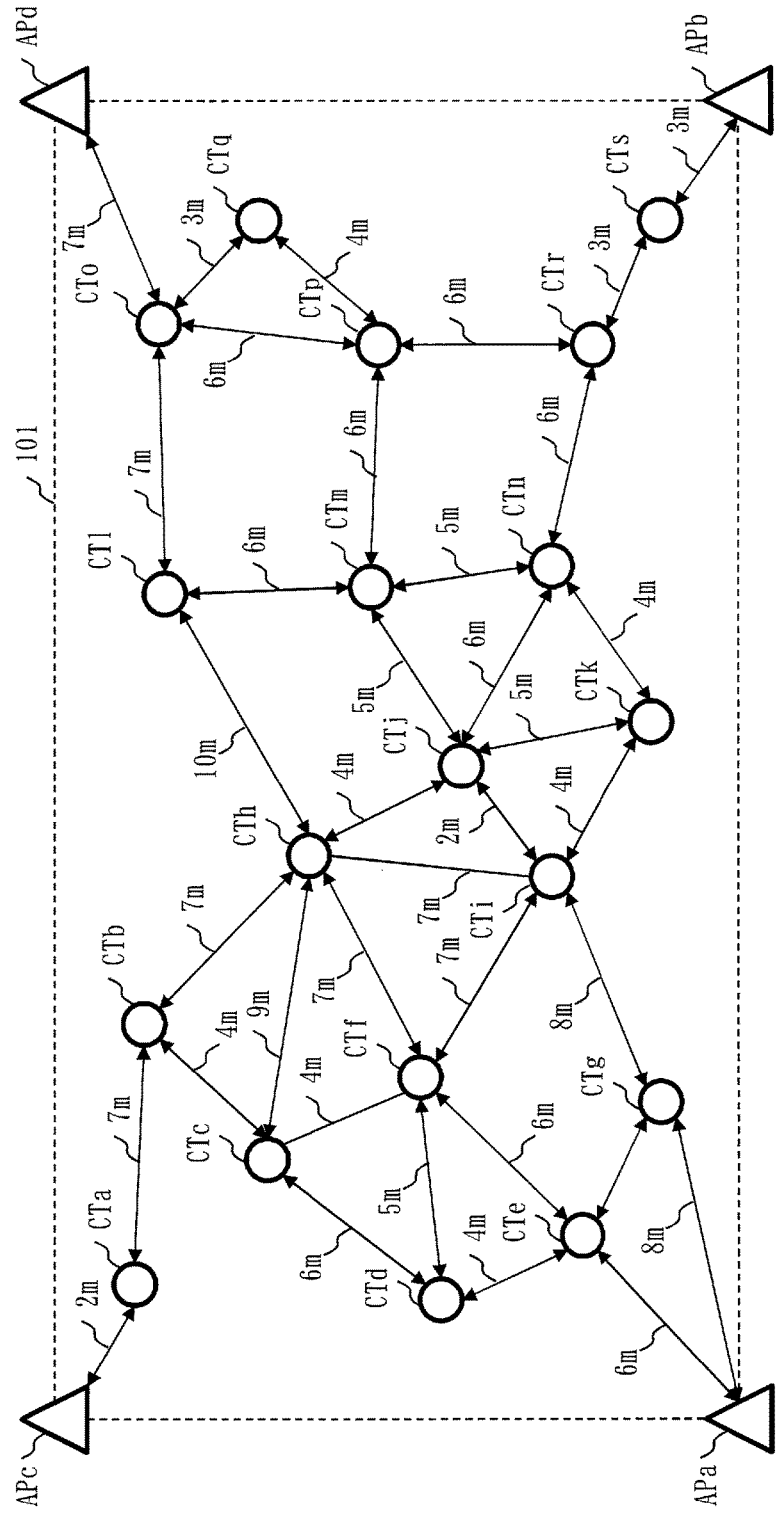
FIG. 23 is a diagram illustrating a specific example of a positional relationship between the communication terminal 200 and an access point 110 in the embodiment 1.

More specifically, when the communication terminals 200 and the access points 110 exist in a positional relationship illustrated in FIG. 23, the measured distance table 420 illustrated in FIG. 16 and FIG. 17 is generated.

Then, the estimated distance table 430 illustrated in FIG. 22 is generated with use of the measured distance table 420 illustrated in FIG. 16 and FIG. 17.

Figure 24:
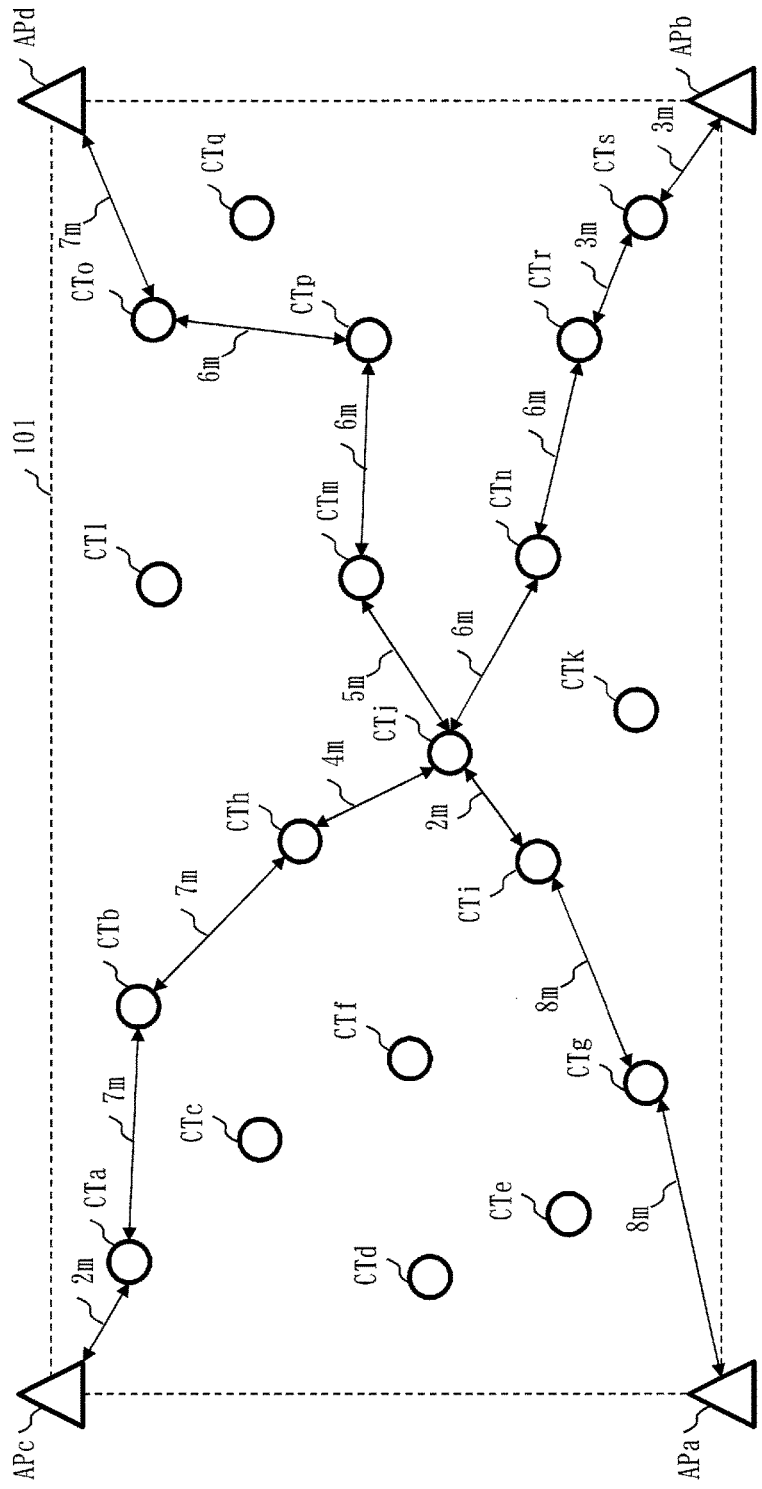
FIG. 24 is a diagram illustrating a specific example of the shortest path between a communication terminal CTj and the access point 110 in the embodiment 1.

In FIG. 23, in terms of the communication terminal CTj, the shortest paths from the communication terminal CTj to the respective access points APa, APb, APc, and APd are paths illustrated in FIG. 24.

In FIG. 24, the distance of the interval included in the shortest distance from the communication terminal CTj to the access point APa is 18 meters. Thus, the estimated distance between the communication terminal CTj and the access point APa is 18 meters. Similarly, the estimated distance with respect to the access point APb is 18 meters, the estimated distance with respect to the access point APc is 20 meters, and the estimated distance with respect to the access point APd is 24 meters.

Then, the estimated distances between the communication terminal CTj and the respective access points APa, APb, APc, and APd are registered with the estimated distance table 430 in association with the terminal identifiers and the access point identifiers, as illustrated in FIG. 22.

Figure 25:
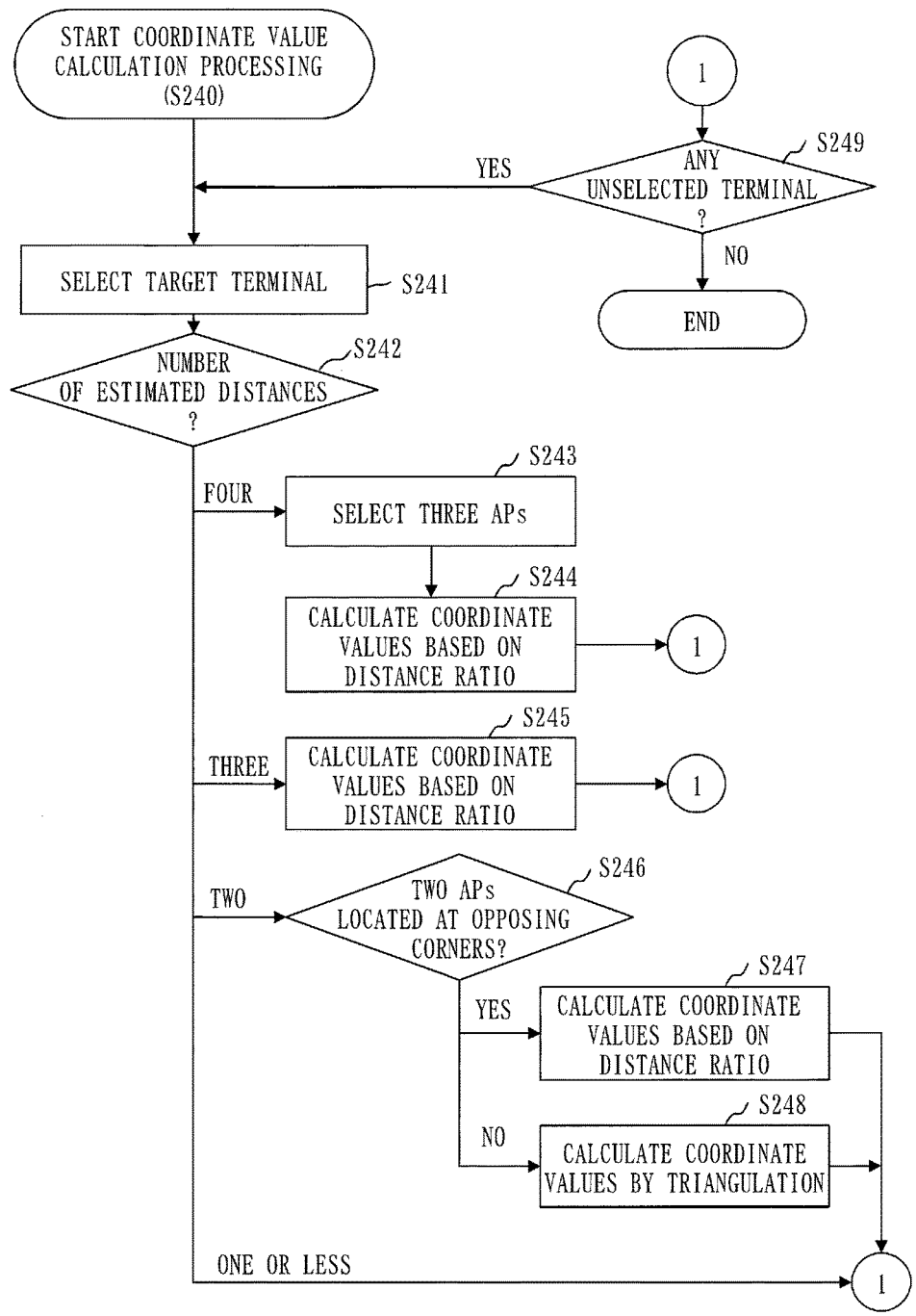
FIG. 25 is a flowchart of coordinate value calculation processing (S240) in the embodiment 1.

The coordinate value calculation processing (S240) is described based on FIG. 25.

In step S241, the identification unit 310 selects a target terminal from unselected communication terminals 200.

More specifically, the identification unit 310 selects one of unselected terminal identifiers from the estimated distance table 430. The communication terminal 200 identified by the selected terminal identifier is the target terminal.

In step S242, the identification unit 310 determines the number of estimated distances calculated as the distances between the target terminal and the respective access points 110.

More specifically, the identification unit 310 selects the identifier of the target terminal from the estimated distance table 430, and determines the number of estimated distances associated with the selected identifier.

However, a value indicating that no estimated distance has been calculated is not counted as an estimated distance.

If the number of estimated distances is four, processing proceeds to step S243.

If the number of estimated distances is three, processing proceeds to step S245.

If the number of estimated distances is two, processing proceeds to step S246.

If the number of estimated distances is one or less, the coordinate values of the target terminal are not calculated, so that processing proceeds to step S249.

In step S243, the identification unit 310 selects three access points from four access points 110.

More specifically, the identification unit 310 selects the identifier of the target terminal from the estimated distance table 430, and selects three estimated distances in ascending order from among four estimated distances associated with the selected identifier. The access points 110 identified by the access point identifiers associated with the selected estimated distances are the selected access points 110.

In step S244, the identification unit 310 calculates coordinate values of the target terminal based on the ratio of estimated distances corresponding to the selected access points 110.

More specifically, the identification unit 310 calculates the coordinate values of the target terminal in the following way.

The identification unit 310 acquires coordinate values associated with the respective identifiers of the selected access points 110 from the access point table 400. The access point table 400 is described below.

Next, the identification unit 310 calculates the ratio of estimated distances corresponding to the selected access points 110.

Then, the identification unit 310 calculates the coordinate values of the target terminal using the respective coordinate values of the selected access points 110 and the ratio of estimated distances corresponding to the selected access points 110.

The access point table 400 is described based on FIG. 26.

The access point table 400 includes a column of access point identifiers 401 and a column of coordinate values 402.

The access point identifier 401 is an identifier for identifying the access point 110.

The coordinate values 402 are values indicating the location of the access point 110.

Figure 27:
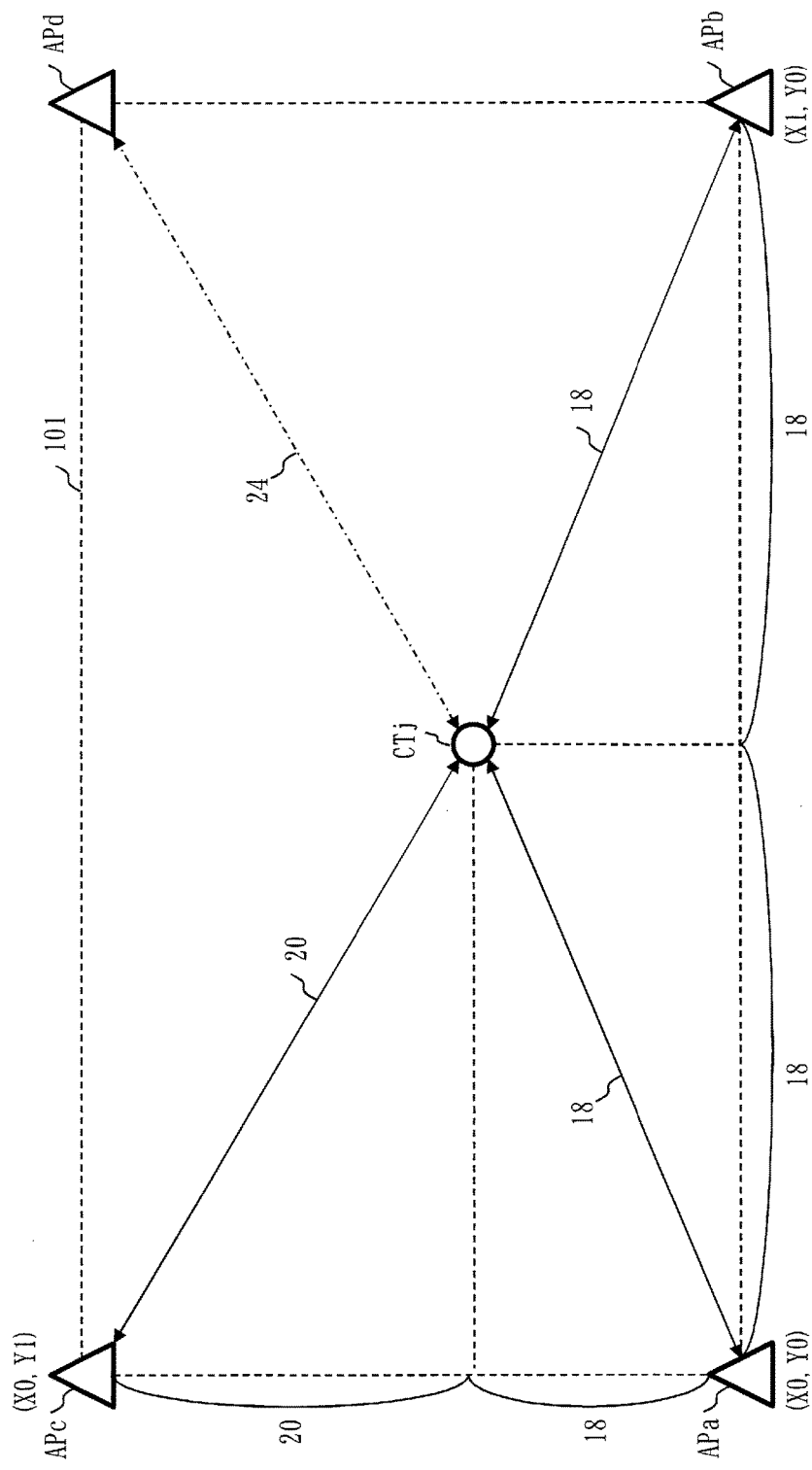
FIG. 27 is a diagram illustrating a specific example of coordinate value calculation processing (in a case where there are three estimated distances) in the embodiment 1.

When the communication terminal CTj and four access points APa to APd are in a positional relationship such as that illustrated in FIG. 27, the communication terminal CTj has an X-axis coordinate value at a position dividing a line segment connecting APa and APc in the ratio of 18:20. Moreover, the communication terminal CTj has a Y-axis coordinate value at a position dividing a line segment connecting APa and APb in the ratio of 18:18.

Thus, the coordinate values of the communication terminal CTj are calculated in the following way in step S243 and step S244.

In step S243, three access points APa, APb, and APc are selected in ascending order of estimated distance with respect to the communication terminal CTj.

The coordinate vales (Xj, Yj) of the communication terminal CTj calculated in step S244 are as follows.

$$Xj = X0 + (X1 - X0) \times (18/36)$$

$$Yj = Y0 + (Y1 - Y0) \times (18/38)$$

The identification unit 310 can calculate the coordinate values of the communication terminal CTj using four estimated distances between the communication terminal CTj and four access points.

More specifically, the identification unit 310 calculates tentative coordinate values of the communication terminal CTj for each of sets of three access points {APa, APb, APc}, {APa, APb, APd}, {APa, APc, APd}, and {APb, APc, APd}. With this, four sets of coordinate values are obtained. Then, the identification unit 310 calculates the averages of four sets of coordinate values as the true coordinate values of the communication terminal CTj.

Figure 28:
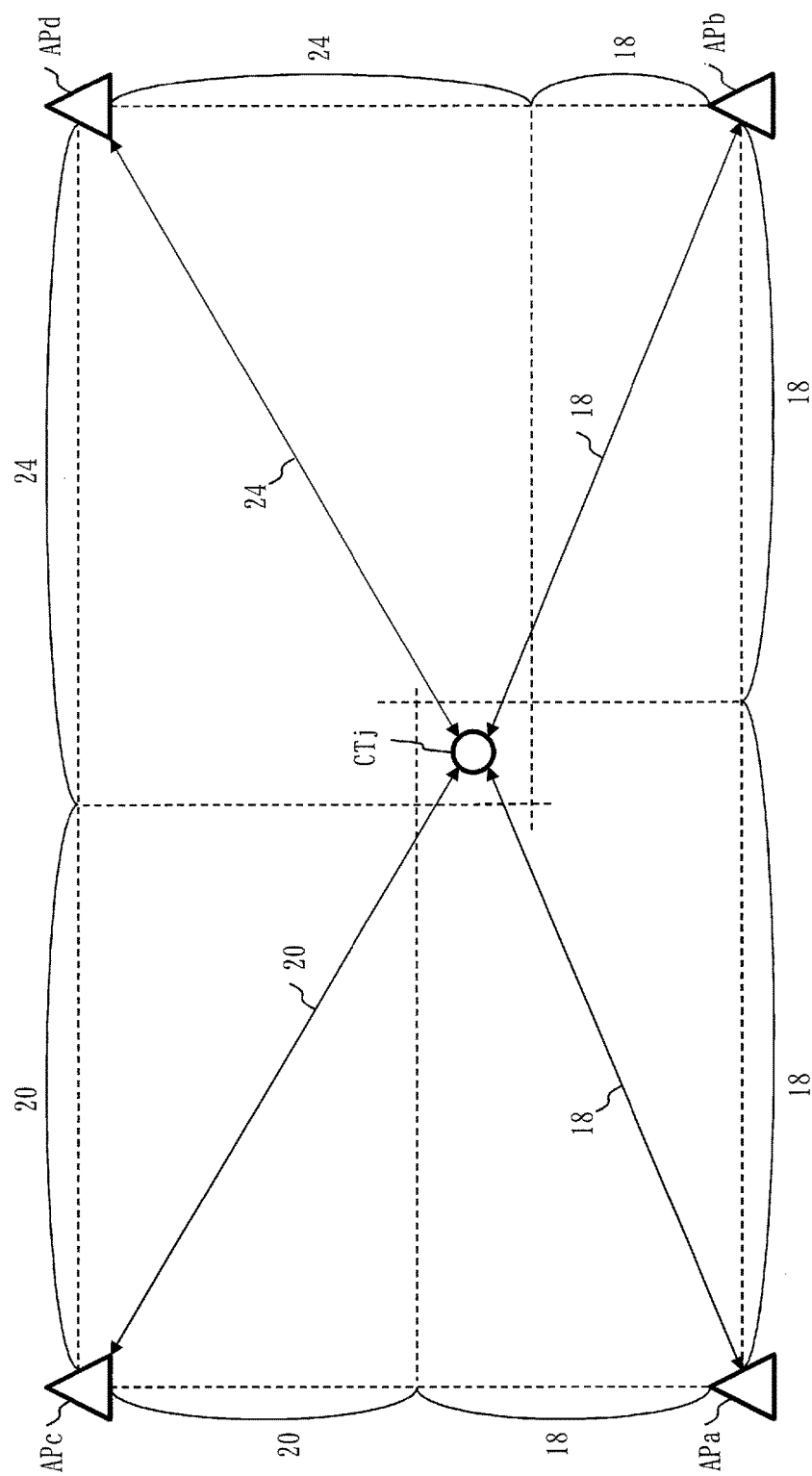
FIG. 28 is a schematic diagram illustrating coordinate value calculation processing (in a case where there are four estimated distances) in the embodiment 1.

FIG. 28 illustrates a conceptual diagram of a method for calculating the coordinate values of the communication terminal CTj using four estimated distances.

Referring back to FIG. 25, the description proceeds from step S245.

In step S245, the identification unit 310 calculates the coordinate values of the target terminal based on the ratio of three estimated distances.

More specifically, the identification unit 310 acquires three estimated distances associated with the identifier of the target terminal from the estimated distance table 430, and calculates the ratio of the acquired estimated distances. Moreover, the identification unit 310 acquires the access point identifiers associated with the acquired estimated distances from the estimated distance table 430, and acquires the coordinate values associated with the acquired access point identifiers from the access point table 400. Then, the identification unit 310 calculates the coordinate values of the target terminal using the acquired coordinate values and the calculated ratio of the acquired estimated distances. The calculation method is the same as that in step S244.

In step S246, the identification unit 310 determines whether two access points 110 are located at opposing corners of the location identification area 101.

More specifically, the identification unit 310 selects the estimated distances associated with the identifier of the target terminal from the estimated distance table 430, and acquires the access point identifiers associated with the selected estimated distances from the estimated distance table 430. However, a value indicating that no estimated distance has been calculated is not selected as the estimated distance. Then, the identification unit 310 makes a determination based on the acquired access point identifiers. More specifically, if the acquired access point identifiers are {APa, APd} or {APb, APc}, the identification unit 310 determines that two access points 110 are located at opposing corners of the location identification area 101.

If two access points 110 are located at opposing corners of the location identification area 101, processing proceeds to step S247.

If two access points 110 are not located at opposing corners of the location identification area 101, processing proceeds to step S248.

In step S247, the identification unit 310 calculates the coordinate values of the target terminal based on the ratio of estimated distances corresponding to two access points 110.

More specifically, the identification unit 310 acquires two estimated distances associated with the identifier of the target terminal from the estimated distance table 430, and calculates the ratio of the acquired estimated distances. Moreover, the identification unit 310 acquires the access point identifiers associated with the acquired estimated distances from the estimated distance table 430, and acquires the coordinate values associated with the acquired access point identifiers from the access point table 400. Then, the identification unit 310 calculates the coordinate values of the target terminal using the acquired coordinate values and the calculated ratio of the acquired estimated distances.

Figure 29:
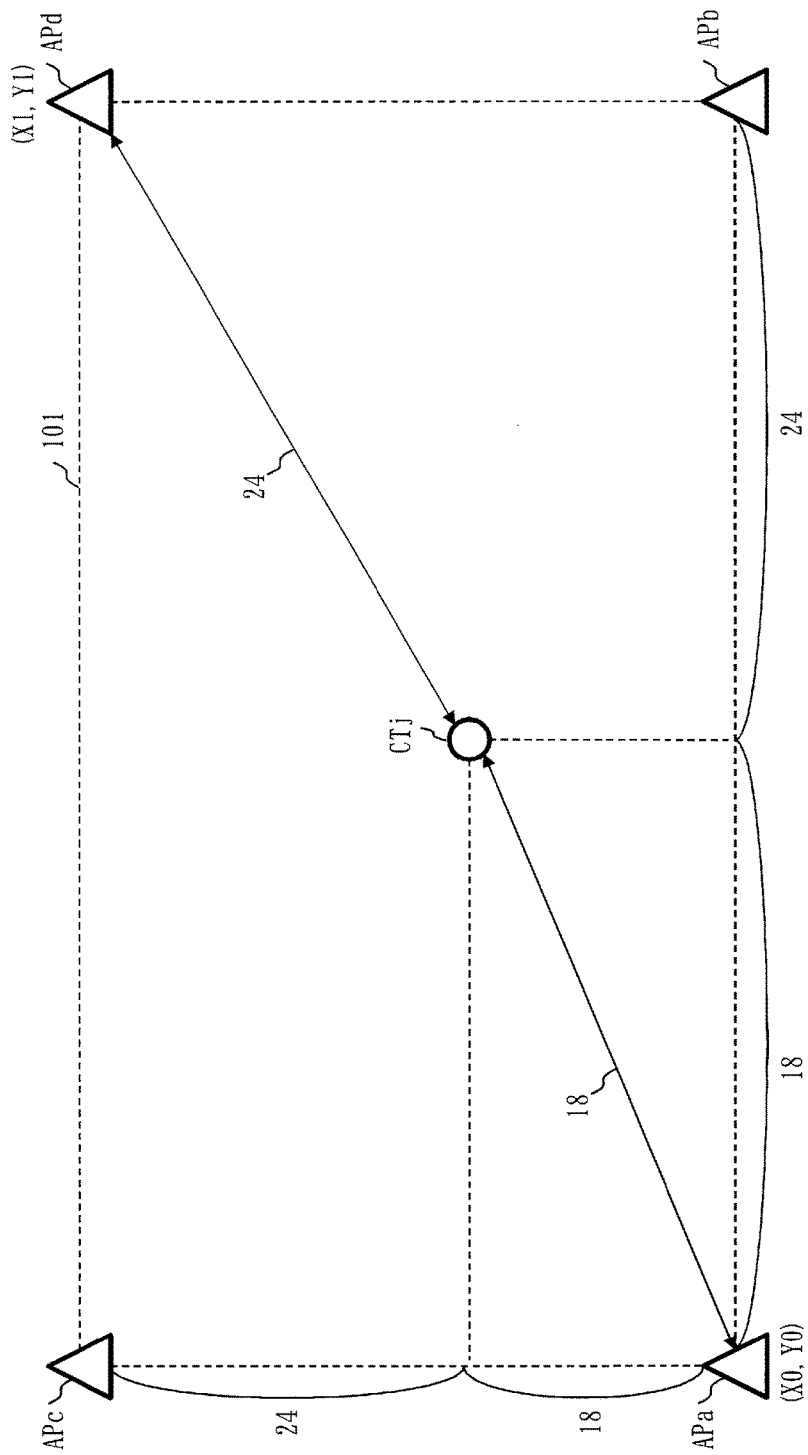
FIG. 29 is a diagram illustrating a specific example of coordinate value calculation processing (in a case where the access points 110 are located at opposing corners) in the embodiment 1.

When the access points APa and APd located at opposing corners across the communication terminal CTj are in a positional relationship such as that illustrated in FIG. 29, the communication terminal CTj has the coordinate values of the position dividing a line segment connecting APa and APd in the ratio of 18:24.

Thus, the coordinate values (Xj, Yj) of the communication terminal CTj calculated in step S244 are as follows.

$$Xj = X0 + (X1 - X0) \times (18/42)$$

$$Yj = Y0 + (Y1 - Y0) \times (18/42)$$

Referring back to FIG. 25, the description proceeds from step S248.

In step S248, the identification unit 310 calculates the coordinate values of the target terminal by triangulation.

More specifically, the identification unit 310 acquires two estimated distances associated with the identifier of the target terminal from the estimated distance table 430. Next, the identification unit 310 acquires access point identifiers associated with the acquired estimated distances from the estimated distance table 430. Next, the identification unit 310 acquires the coordinate values associated with the acquired access point identifiers from the access point table 400. Next, the identification unit 310 calculates the distance between the access points using the acquired coordinate values. Then, the identification unit 310 calculates the coordinate values of the target terminal by performing triangulation using the two estimated distances, the calculated distances, and the acquired coordinate values.

Figure 30:
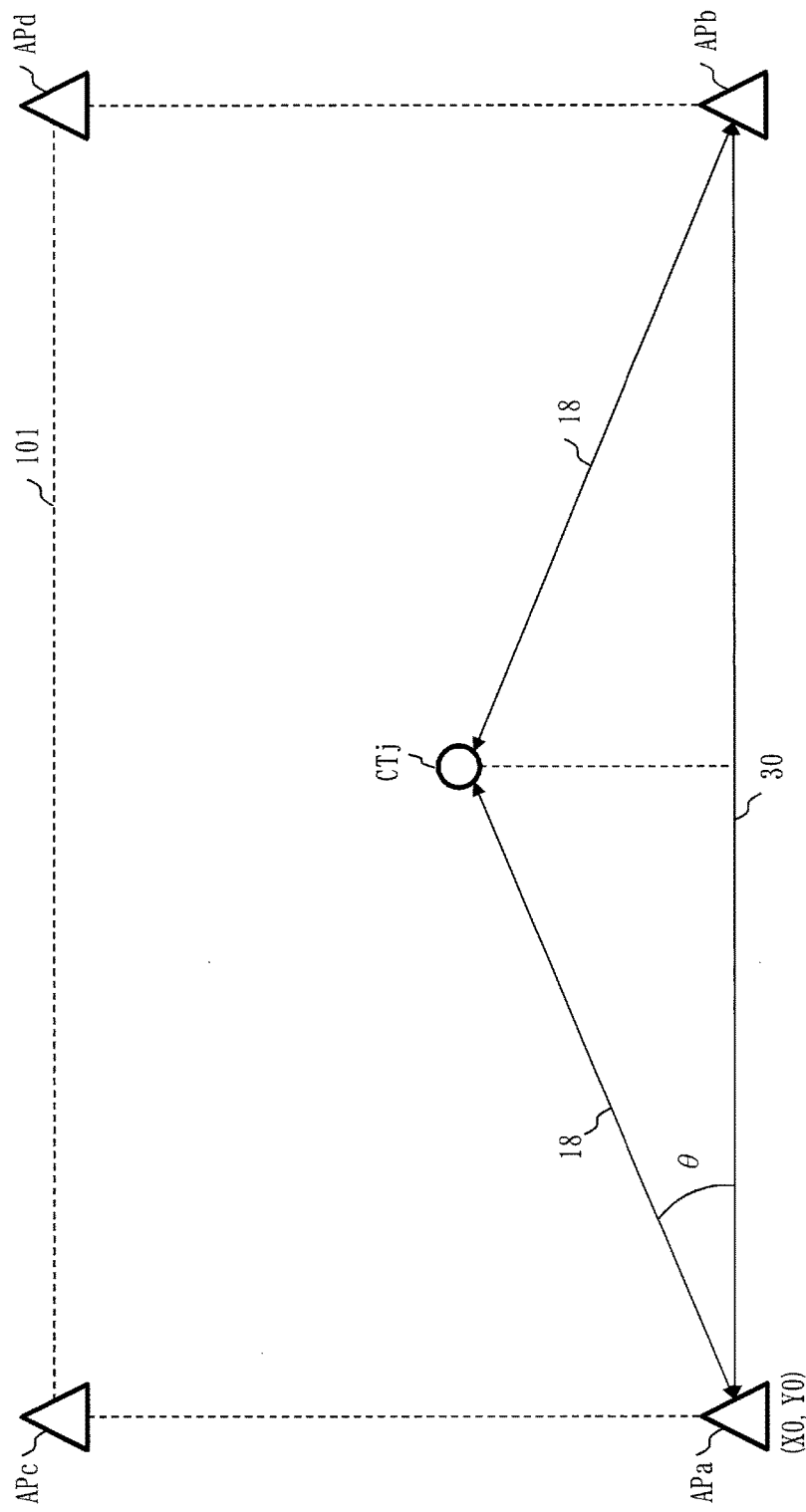
FIG. 30 is a diagram illustrating a specific example of coordinate value calculation processing (in a case where the access points 110 are not located at opposing corners) in the embodiment 1.

When the communication terminal CTj and two access points APa and APb are in a positional relationship such as that illustrated in FIG. 30, the coordinate values (Xj, Yj) of the communication terminal CTj calculated in step S248 are as follows.

$$\cos\theta = (18^2 + 30^2 - 18^2)/(2 \times 18 \times 30) = 0.83$$

$$\sin\theta = \sqrt{(1 - \cos^2\theta)} = 0.55$$

$$Xj = X0 + (18 \times \cos\theta) = X0 + 15$$

$$Yj = Y0 + (18 \times \sin\theta) = Y0 + 9.95$$

Referring back to FIG. 25, step S249 is described.

In step S249, the identification unit 310 determines whether there is an unselected communication terminal 200, which is not yet selected as the target terminal.

If there is an unselected communication terminal 200, processing returns to step S241.

If there is no unselected communication terminal 200, the coordinate value calculation processing (S240) ends.

Furthermore, the identification unit 310 registers the coordinate values calculated in the coordinate value calculation processing (S240) with the terminal table 440 while associating the coordinate values with the identifier of the target terminal.

As illustrated in FIG. 31, the terminal table 440 includes a column of terminal identifiers 441 and a column of coordinate values 442.

The terminal identifier 441 is an identifier for identifying the communication terminal 200.

The coordinate values 442 are values indicating the location of the communication terminal 200.

———Advantageous Effects of Embodiment 1———

The location identification system 100 enables identifying the location of each communication terminal 200. Particularly, even if not a great number of communication terminals 200 are present in the location identification area 101, the location identification system 100 is able to identify the location of each communication terminal 200 as long as adjacent terminals which propagate the distance packet 120 are present.

The location identification apparatus 300 uses the measured distance 126, which is included in the distance packet 120 propagated by each communication terminal 200, and is, therefore, able to identify the location of each communication terminal 200 in real time.

Since each communication terminal 200 only needs to propagate the distance packet 120, a load on each communication terminal 200 is small.

The location identification system 100 can be utilized for management of entering and leaving in a building, management of the ticket gate of a station, or the like.

In the management of entering and leaving in a building, using the location identification system 100 enables understanding the location of a person who carries a communication terminal 200 in the building. Then, it becomes possible to manage whether an appropriate person is present in the appropriate location. When a person is present in an elevator hall, even if the person does not press a button in the elevator hall, it becomes possible to move the elevator to a floor on which the person is present. Furthermore, when information about a floor on which the person's room is present is previously stored in the communication terminal 200, even if the person does not press a button in the elevator, it becomes possible to move the elevator to the floor on which the person's room is present. Moreover, when information for identifying a prohibited area in which entry is prohibited is previously stored in a communication terminal 200, even if a person who carries the communication terminal 200 comes close to the prohibited area, it becomes possible to prevent the gate of the prohibited area from opening. Furthermore, when the person has entered the prohibited area, it becomes possible to issue some kind of warning.

In the management of the ticket gate of a station, using the location identification system 100 enables managing entering and leaving of passengers even if no ticket gate is provided in the station. More specifically, it becomes possible to charge a fare to a passenger who rides in a train while carrying the communication terminal 200. Moreover, when a destination is previously stored in the communication terminal 200, it becomes possible to guide the passenger to a platform at which to ride in a train and to a platform at which to get off the train. Furthermore, it becomes possible to guide a passenger to a place where a platform or a train is not crowded.

———Other Configurations———

The number of access points 110 can be three or five or greater.

The location identification area 101 can be an area of triangular, pentagonal, circular, or other shape.

Embodiment 2

An embodiment which calculates the coordinate values of a communication terminal 200 by performing coordinate value calculation processing (S240) that is different from that in the embodiment 1 is described based on FIG. 32 to FIG. 38. However, descriptions that overlap those in the embodiment 1 are omitted or simplified.

———Description of Configuration———

The configurations of the location identification system 100, the communication terminal 200, and the location identification apparatus 300 are the same as those in the embodiment 1.

———Description of Operation———

The communication method employed by the communication terminal 200 is the same as that in the embodiment 1.

The flow of processing for the location identification method employed by the location identification apparatus 300 is the same as that in the embodiment 1. However, part of the coordinate value calculation processing (S240) is different from that in the embodiment 1.

Figure 32:
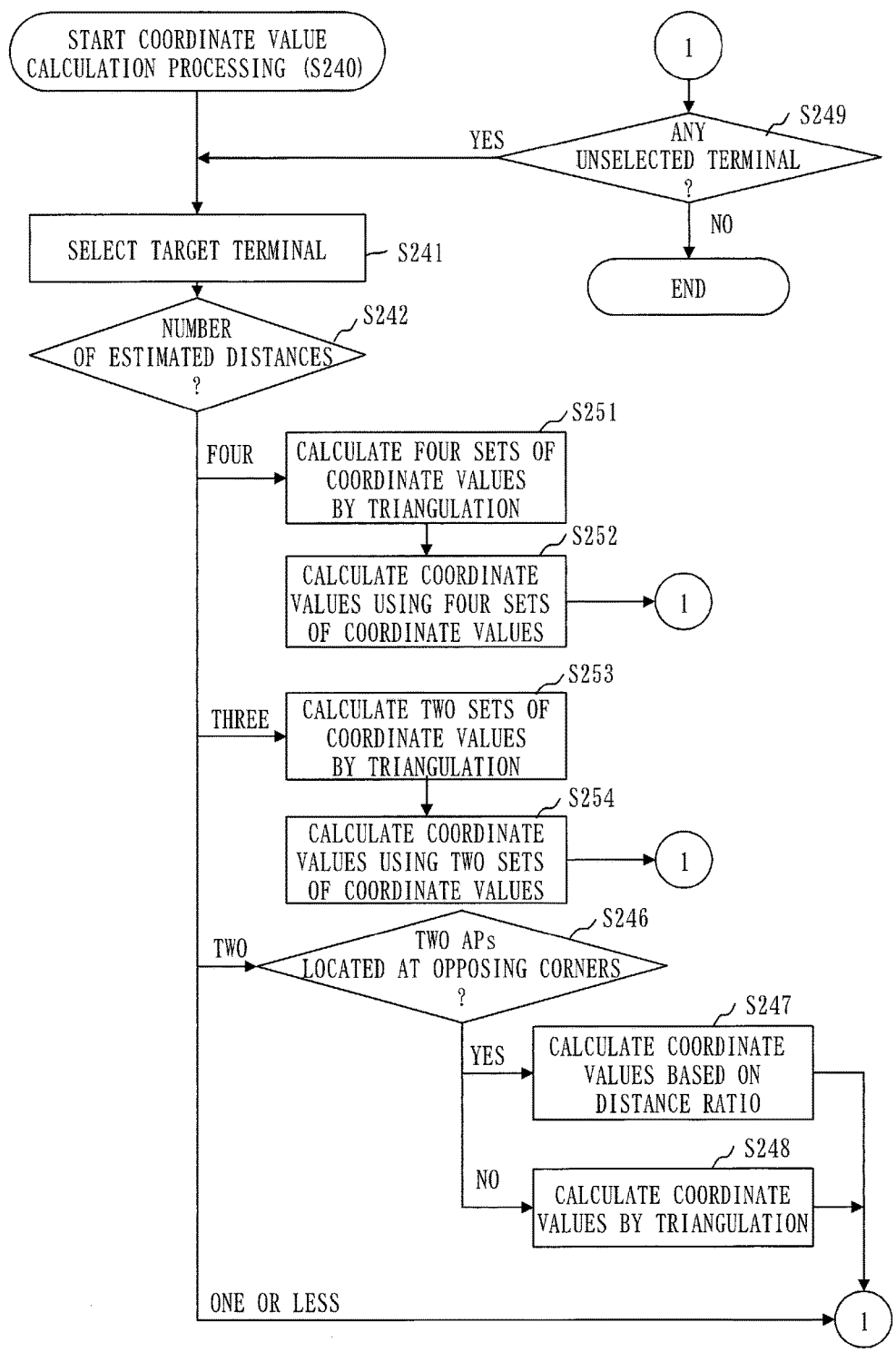
FIG. 32 is a flowchart of coordinate value calculation processing (S240) in an embodiment 2.

The coordinate value calculation processing (S240) is described based on FIG. 32.

Step S241 and step S242 are the same as those in the embodiment 1.

If the number of estimated distances is four, processing proceeds to step S251.

If the number of estimated distances is three, processing proceeds to step S253.

If the number of estimated distances is two, processing proceeds to step S246. Step S246 to step S248 are the same as those in the embodiment 1.

If the number of estimated distances is one or less, the coordinate values of the target terminal are not calculated, so that processing proceeds to step S249. Step S249 is the same as that in the embodiment 1.

In step S251, the identification unit 310 calculates four sets of coordinate values by triangulation. The method for calculating each set of coordinate values is the same as that in step S248.

More specifically, the identification unit 310 calculates four sets of coordinate values in the following way.

Figure 33:
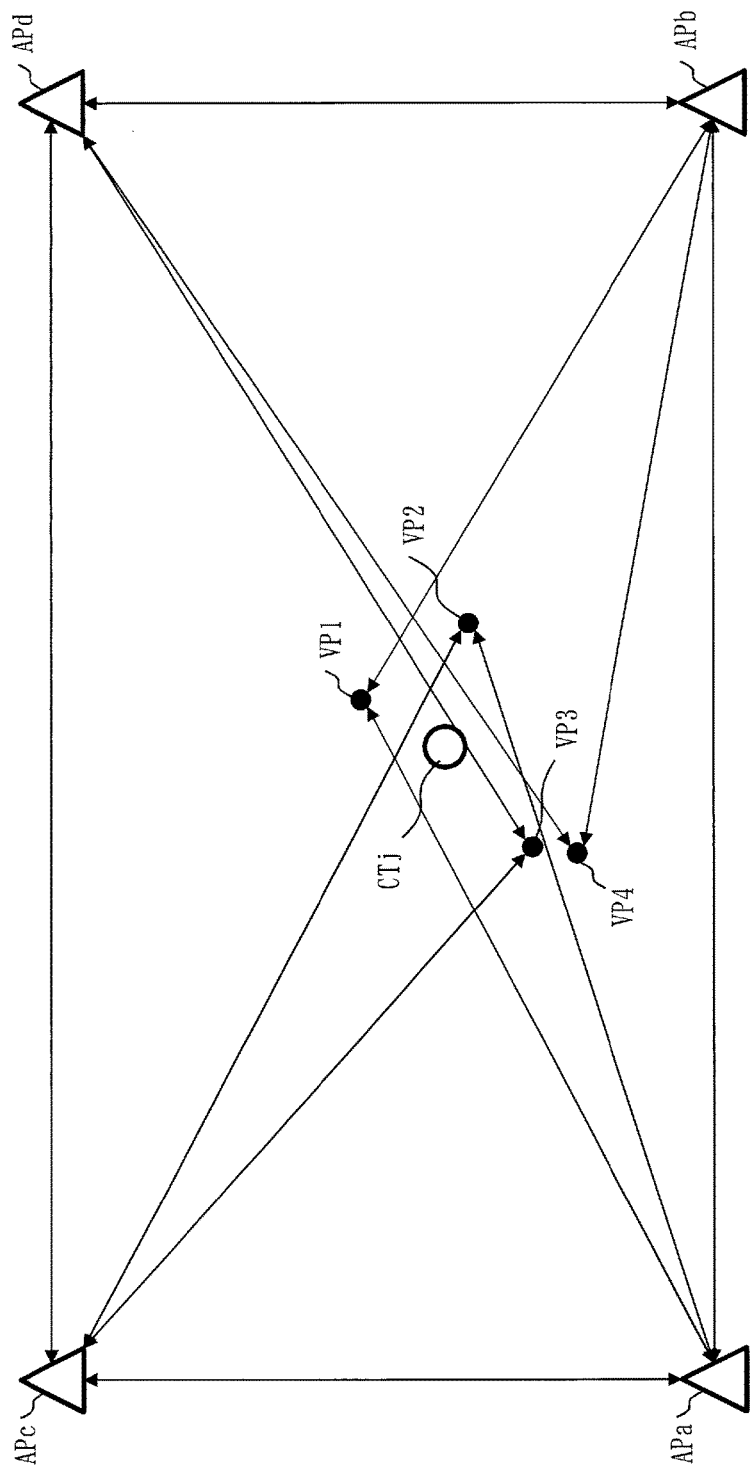
FIG. 33 is a diagram illustrating a specific example of coordinate value calculation processing (in a case where there are four estimated distances) in the embodiment 2.

Referring to FIG. 33, four triangles each of which has, as vertexes thereof, two adjacent access points and a virtual point expressed by a filled circle are generated. The virtual point is a virtual communication terminal CTj. Thus, the virtual point is a point located away from each of two adjacent access points by an estimated distance between the access point and the communication terminal CTj.

When the sides of a triangle having, as vertexes thereof, an access point APa, an access point APb, and a virtual point VP1 have respective lengths illustrated in FIG. 34, the coordinate values (X1, Y1) of the virtual point VP1 are as follows. However, the access point APa is set as an origin. In other words, the coordinate values of the access point APa are set as (0, 0).

$\cos \alpha = (18^2+30^2-18^2)/(2\times18\times30)=0.83$ $\sin \alpha = \sqrt{(1-\cos^2\alpha)}=0.55$ $X1=18\times\cos \alpha=15.0$ $Y1=18\times\sin \alpha=10.0$ $(X1,Y1)=(15.0,10.0)$ When the sides of a triangle having, as vertexes thereof, an access point APa, an access point APc, and a virtual point VP2 have respective lengths illustrated in FIG. 35, the coordinate values (X2, Y2) of the virtual point VP2 are as follows.

$\cos \beta = (18^2+20^2-20^2)/(2\times18\times20)=0.45$ $\sin \beta = \sqrt{(1-\cos^2\beta)}=0.89$ $X2=18\times\sin \beta=16.1$ $Y2=18\times\cos \beta=8.1$ $(X2,Y2)=(16.1,8.1)$ When the sides of a triangle having, as vertexes thereof, an access point APc, an access point APd, and a virtual point VP3 have respective lengths illustrated in FIG. 36, the coordinate values (X3, Y3) of the virtual point VP3 are as follows.

$\cos \gamma = (20^2+30^2-24^2)/(2\times20\times30)=0.60$ $\sin \gamma = \sqrt{(1-\cos^2\gamma)}=0.80$ $X3=20\times\cos \gamma=12.1$ $Y3=20-(20\times\sin \gamma)=4.1$ $(X3,Y3)=(12.1,4.1)$ When the sides of a triangle having, as vertexes thereof, an access point APb, an access point APd, and a virtual point VP4 have respective lengths illustrated in FIG. 37, the coordinate values (X4, Y4) of the virtual point VP4 are as follows.

$\cos \sigma = (18^2+20^2-24^2)/(2\times18\times20)=0.21$ $\sin \sigma = \sqrt{(1-\cos^2\sigma)}=0.98$ $X4=30-(18\times\sin \sigma)=12.4$ $Y4=18\times\cos \sigma=3.7$ $(X4,Y4)=(12.4,3.7)$ Referring back to FIG. 32, the description proceeds from step S252.

In step S252, the identification unit 310 calculates the coordinate values of the target terminal using four sets of coordinate values.

More specifically, the identification unit 310 calculates the coordinate values of the target terminal according to the following (a) or (b).

(a) The identification unit 310 calculates averages of four sets of coordinate values as the coordinate values of the target terminal.

When four sets of coordinate values obtained in FIG. 34 to FIG. 37 are used, the coordinate values (Xj, Yj) of the communication terminal CTj serving as the target terminal are as follows.

$Xj=(X1+X2+X3+X4)/4=13.9$ $Yj=(Y1+Y2+Y3+Y4)/4=6.5$ $(Xj,Yj)=(13.9,6.5)$ (b) The identification unit 310 calculates a weighting value for each set of coordinate values based on estimated distances corresponding to the coordinate values, and multiplies each set of coordinate values by the weighting value. A specific weighting value is the reciprocal of the sum of estimated distances. With this, four set of weighted coordinate values are calculated. Then, the identification unit 310 calculates the averages of four set of weighted coordinate values as the coordinate values of the target terminal.

Figure 34:
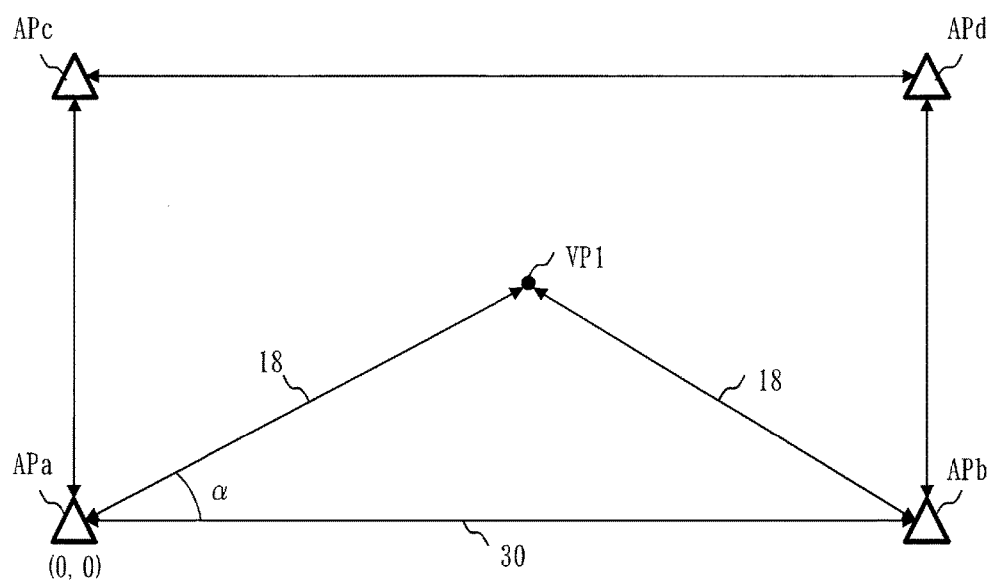
FIG. 34 is a diagram illustrating a specific example of coordinate value calculation processing (in a case where there are four estimated distances) in the embodiment 2.

In FIG. 34, the sum of estimated distances corresponding to the coordinate values (X1, Y1) of the virtual point VP1 is 36 (=18+18). Accordingly, the weighting value is $1/36$.

Figure 35:
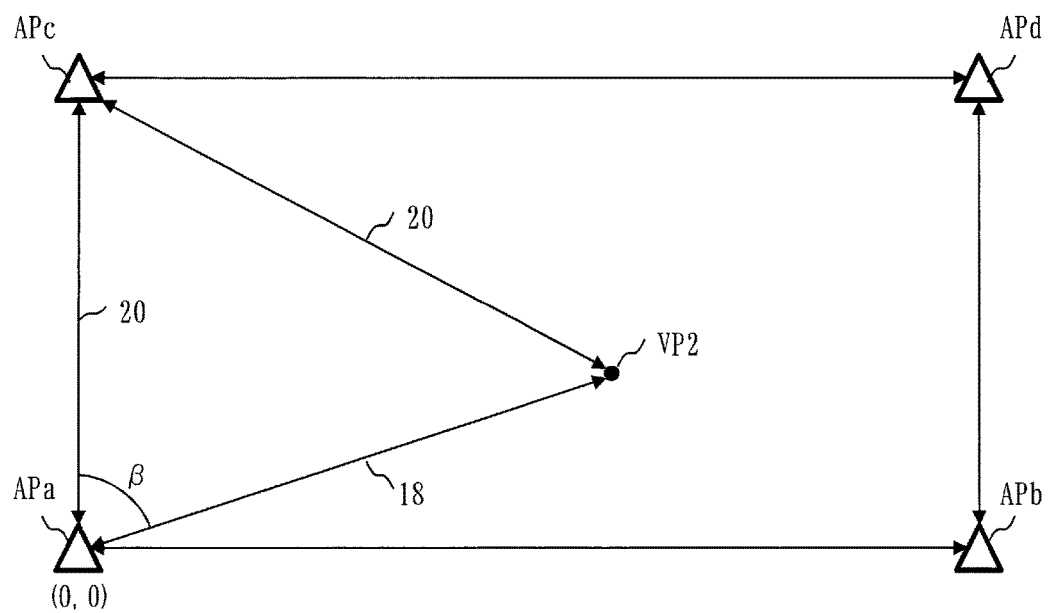
FIG. 35 is a diagram illustrating a specific example of coordinate value calculation processing (in a case where there are four estimated distances) in the embodiment 2.

In FIG. 35, the sum of estimated distances corresponding to the coordinate values (X2, Y2) of the virtual point VP2 is 38 (=18+20). Accordingly, the weighting value is $1/38$.

Figure 36:
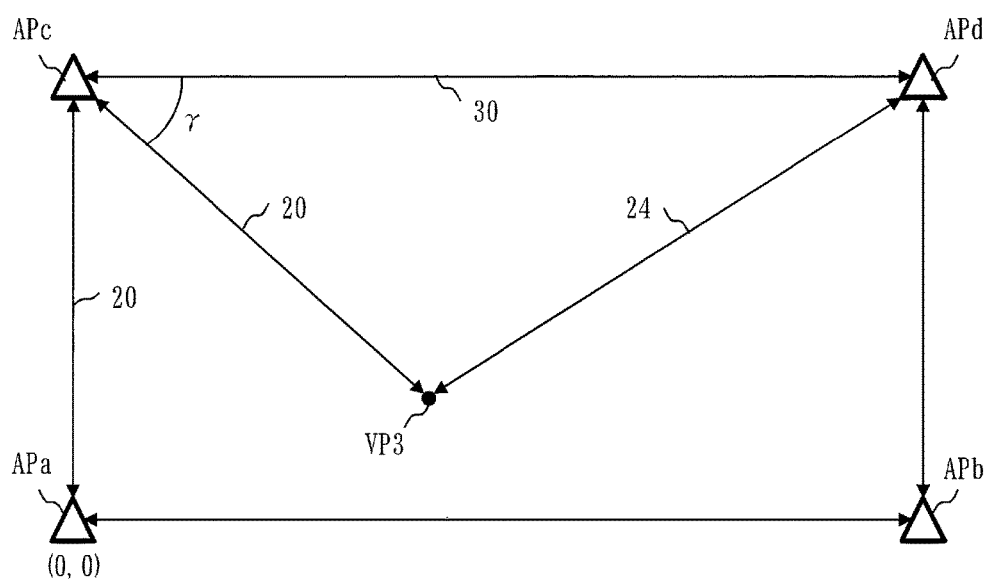
FIG. 36 is a diagram illustrating a specific example of coordinate value calculation processing (in a case where there are four estimated distances) in the embodiment 2.

In FIG. 36, the sum of estimated distances corresponding to the coordinate values (X3, Y3) of the virtual point VP3 is 44 (=20+24). Accordingly, the weighting value is $1/44$.

Figure 37:
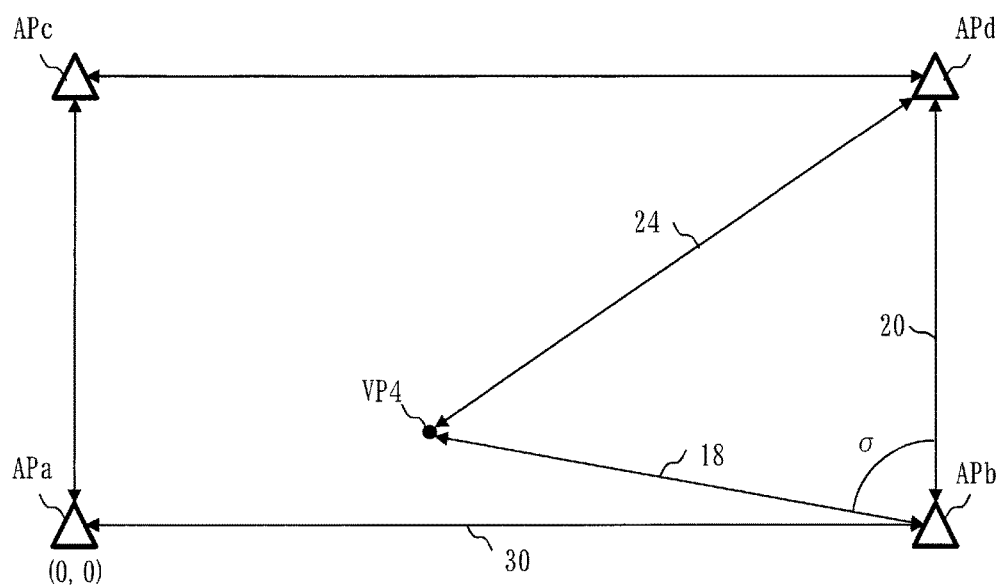
FIG. 37 is a diagram illustrating a specific example of coordinate value calculation processing (in a case where there are four estimated distances) in the embodiment 2.

In FIG. 37, the sum of estimated distances corresponding to the coordinate values (X4, Y4) of the virtual point VP4 is 42 (=18+24). Accordingly, the weighting value is $1/42$.

When these weighting values are used, the coordinate values (Xj, Yj) of the communication terminal CTj serving as the target terminal are as follows.

$Xj$=Numerator $X$/Denominator=14.0

Denominator=$(1/36)+(1/38)+(1/44)+(1/42)$

Numerator $X=(X1/36)+(X2/38)+(X3/44)+(X4/42)$ $Yj$=Numerator $Y$/Denominator=6.7

Numerator $Y$=($Y1/36$)+($Y2/38$)+($Y3/44$)+($Y4/42$)

($Xj, Yj$)=(14.0, 6.7)

Referring back to FIG. 32, the description proceeds from step S253.

In step S253, the identification unit 310 calculates two sets of coordinate values by triangulation. The method for calculating each set of coordinate values is the same as that in step S248 and step S251.

More specifically, the identification unit 310 calculates two sets of coordinate values in the following way.

Figure 38:
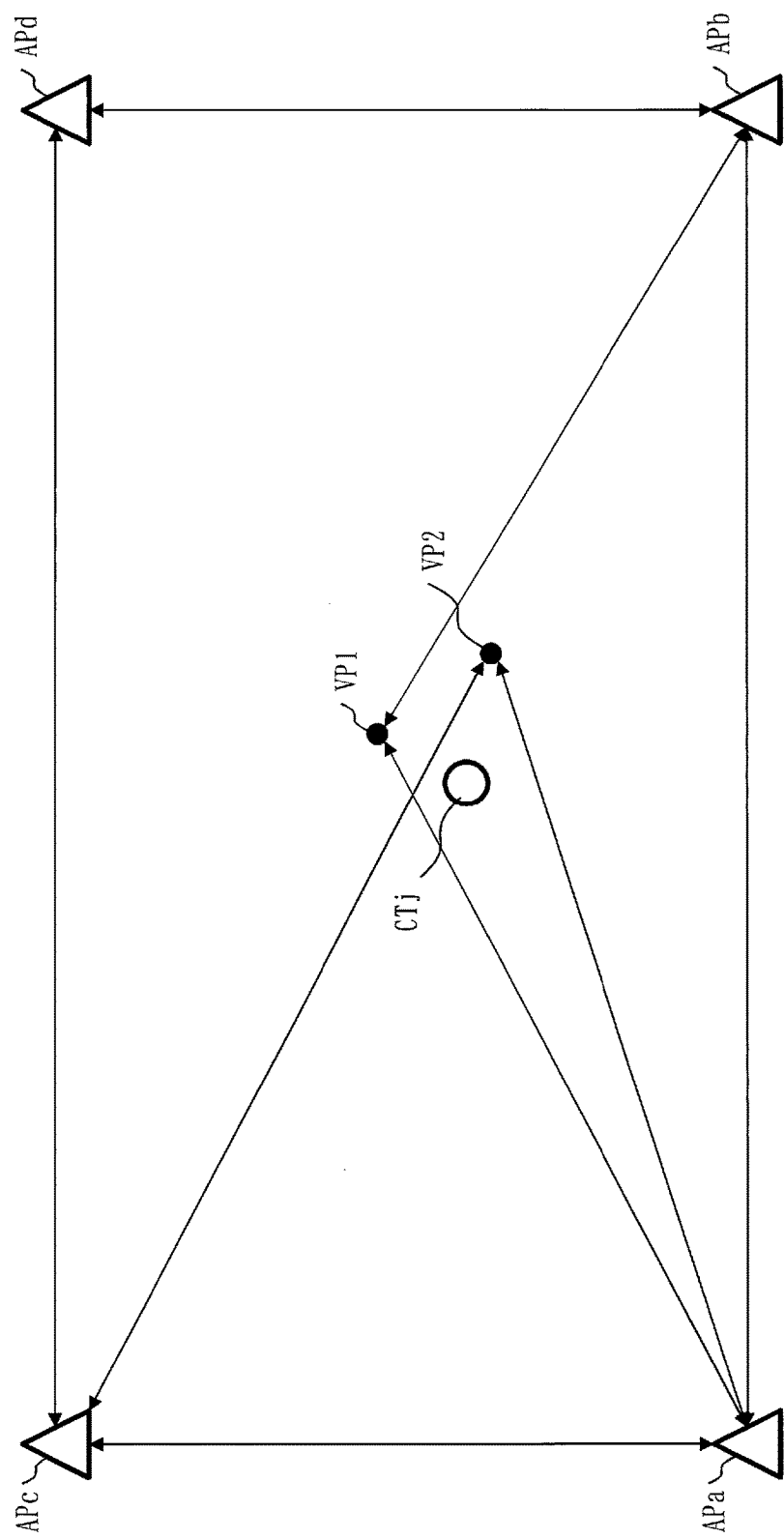
FIG. 38 is a diagram illustrating a specific example of coordinate value calculation processing (in a case where there are three estimated distances) in the embodiment 2.

Referring to FIG. 38, two triangles each of which has, as vertexes thereof, two adjacent access points and a virtual point expressed by a filled circle are generated.

As described with reference to FIG. 34, the coordinate values (X1, Y1) of the virtual point VP1 are (15.0, 10.0).

As described with reference to FIG. 35, the coordinate values (X2, Y2) of the virtual point VP2 are (16.1, 8.1).

Referring back to FIG. 32, the description proceeds from step S254.

In step S254, the identification unit 310 calculates the coordinate values of the target terminal using two sets of coordinate values.

More specifically, the identification unit 310 calculates the coordinate values of the target terminal according to the following (a), (b), or (c). (a) and (b) are the same as those in step S252.

(a) The identification unit 310 calculates averages of two sets of coordinate values as the coordinate values of the target terminal. Thus, the coordinate values (Xj, Yj) of the communication terminal CTj serving as the target terminal are as follows.

$Xj$=($X1+X2$)/2=13.5

$Yj$=($Y1+Y2$)/2=9.0

($Xj, Yj$)=(13.5, 9.0)

(b) The identification unit 310 calculates averages of two sets of weighted coordinate values as the coordinate values of the target terminal. Thus, the coordinate values (Xj, Yj) of the communication terminal CTj serving as the target terminal are as follows.

$Xj$=Numerator $X$/Denominator=15.5

Denominator=(1/36)+(1/38)

Numerator $X$=($X1/36$)+($X2/38$)

$Yj$=Numerator $Y$/Denominator=9.0

Numerator $Y$=($Y1/36$)+($Y2/38$)

($Xj, Yj$)=(15.5, 9.0)

(c) The identification unit 310 generates two sets of candidate values by interchanging Y-coordinate values of two sets of coordinate values with each other. Thus, when two sets of coordinate values are (X1, Y1) and (X2, Y2), two sets of candidate values to be generated are (X1, Y2) and (X2, Y1).

Then, the identification unit 310 selects one set of candidate values from the two sets of candidate values as the coordinate values of the target terminal. More specifically, the identification unit 310 calculates two comparative distances using the two sets of candidate values and the coordinate values of an access point APd whose estimated distance has not been calculated. The comparative distance is the distance between a point indicated by a set of candidate values and the access point APd. Next, the identification unit 310 compares the two comparative distances with each other. Then, the identification unit 310 selects one set of candidate values from the two sets of candidate values based on a result of comparison of the comparative distances. More specifically, the identification unit 310 selects a set of candidate values corresponding to a candidate point whose comparative distance is longer.

When the first candidate values are (15.0, 8.1) and the coordinate values of the access point APd are (30, 20), the first comparative distance is 19.1. Moreover, when the second candidate values are (16.1, 10.0), the second comparative distance is 17.2. In this case, since the first comparative distance is longer than the second comparative distance, the first candidate values are selected as the coordinate values of the target terminal.

———Advantageous Effects of Embodiment 2———

An effect of more improving the precision of the coordinate values of the communication terminal 200 than in the embodiment 1 can be expected.

———Supplemental to Description———

In each embodiment, the functions of the communication terminal 200 and the location identification apparatus 300 can be implemented by hardware.

Figure 39:
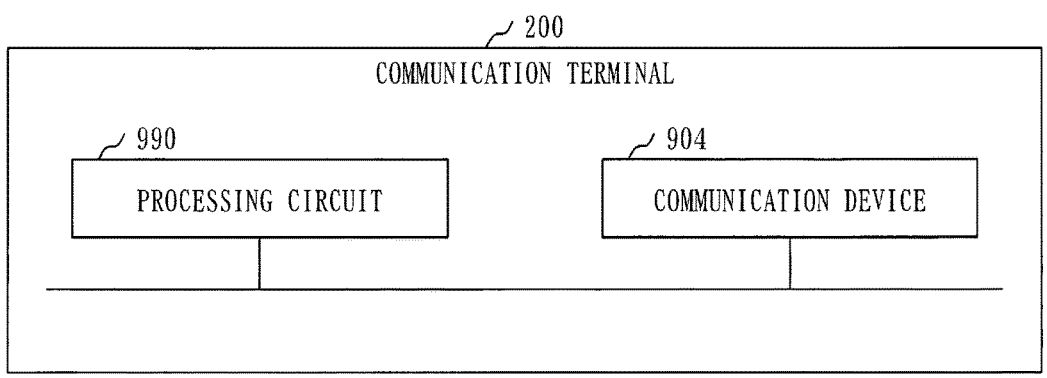
FIG. 39 is a hardware configuration diagram of the communication terminal 200 in the embodiments.

FIG. 39 illustrates a configuration in which the function of the communication terminal 200 is implemented by hardware.

The communication terminal 200 includes a processing circuit 990 and a communication device 904. The processing circuit 990 is also called a processing circuitry.

The processing circuit 990 is a dedicated electronic circuit which implements the functions of "units" of the communication terminal 200. The "unit" also includes a storage unit.

More specifically, the processing circuit 990 is a single circuit, a composite circuit, a programmed processor, a parallel programmed processor, a logic IC, a GA, an ASIC, an FPGA, or their combination. GA is an abbreviation for Gate Array, ASIC is an abbreviation for Application Specific Integrated Circuit, and FPGA is an abbreviation for Field Programmable Gate Array.

Furthermore, the communication terminal 200 can include a plurality of processing circuits 990, and the plurality of processing circuits 990 can implement the functions of "units" of the communication terminal 200 in cooperation with each other.

The function of the communication terminal 200 can be implemented by a combination of software and hardware. Thus, a part of "units" of the communication terminal 200 can be implemented by software, and the remaining part of the "units" of the communication terminal 200 can be implemented by hardware.

Figure 40:
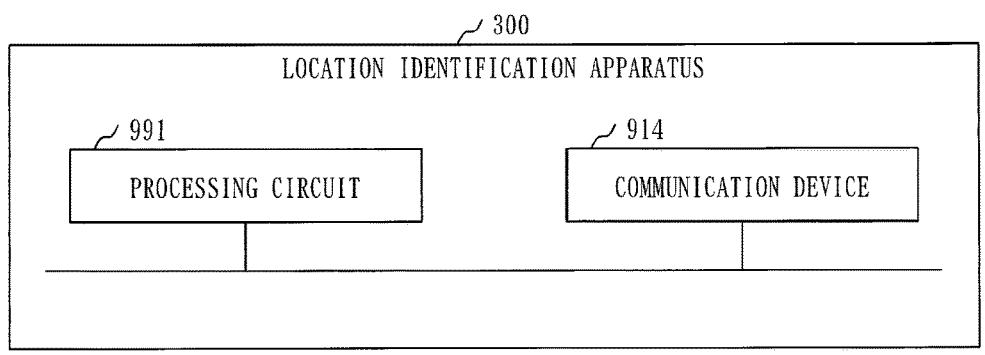
FIG. 40 is a hardware configuration diagram of the location identification apparatus 300 in the embodiments.

FIG. 40 illustrates a configuration in which the function of the location identification apparatus 300 is implemented by hardware.

The location identification apparatus 300 includes a processing circuit 991 and a communication device 914. The processing circuit 991 is also called a processing circuitry.

The processing circuit 991 is a dedicated electronic circuit which implements the functions of "units" of the location identification apparatus 300. The "unit" also includes a storage unit. The specific processing circuit 991 is the same as the processing circuit 990 of the communication terminal 200.

Furthermore, the location identification apparatus 300 can include a plurality of processing circuits 991, and the plurality of processing circuits 991 can implement the functions of "units" of the location identification apparatus 300 in cooperation with each other.

The function of the location identification apparatus 300 can be implemented by a combination of software and hardware. Thus, a part of "units" of the location identification apparatus 300 can be implemented by software, and the remaining part of the "units" of the location identification apparatus 300 can be implemented by hardware.

Each embodiment is merely an example of a desirable embodiment, and is not intended to limit the technical scope of the invention. Each embodiment can be carried out in part, or can be carried out in combination with another embodiment.

The procedures described with use of flowcharts and so on are examples of the procedures of a method and a program.

REFERENCE SIGNS LIST

100: location identification system, 101: location identification area, 102: encryption key, 103: decryption key, 110: access point, 120: distance packet, 121: packet header, 122: distance header, 123: packet type, 124: terminal information, 125: encryption identifier, 126: measured distance, 127: distance footer, 128: footer flag, 129: end-point point identifier, 130: start request packet, 131: packet header, 132: packet type, 133: start-point terminal identifier, 134: start-point point identifier, 140: start response packet, 141: packet header, 142: packet type, 143: time stamp, 200: communication terminal, 210: detection unit, 220: measurement unit, 230: editing unit, 231: generation unit, 232: addition unit, 240: discard unit, 250: preprocessing unit, 281: reception unit, 282: transmission unit, 300: location identification apparatus, 310: identification unit, 320: preprocessing unit, 381: reception unit, 382: transmission unit, 400: access point table, 401: access point identifier, 402: coordinate values, 410: history table, 411: history identifier, 420: measured distance table, 421: first identifier, 422: second identifier, 430: estimated distance table, 431: terminal identifier, 432: access point identifier, 433: estimated distance, 440: terminal table, 441: terminal identifier, 442: coordinate values, 451: first working table, 452: second working table, 453: third working table, 901: processor, 902: memory, 903: auxiliary storage device, 904: communication device, 905: receiver, 906: transmitter, 911: processor, 912: memory, 913: auxiliary storage device, 914: communication device, 915: receiver, 916: transmitter, 990, 991: processing circuit.

The invention claimed is:

1. A location identification apparatus comprising:
a receiver to receive a distance packet including, as a start-point distance, a distance between a start-point terminal, which is a communication terminal, and a start-point point, which is an access point detected by the start-point terminal, including, as an end-point distance, a distance between an end-point terminal, which is a communication terminal different from the start-point terminal, and an end-point point, which is an access point detected by the end-point terminal, and including, as a terminal distance, a distance between each other of a plurality of communication terminals including the start-point terminal and the end-point terminal; and
a processing circuitry to identify a location of each communication terminal based on the start-point distance, the end-point distance, and the terminal distance which are included in the received distance packet, coordinate values of the start-point point, and coordinate values of the end-point point.

2. The location identification apparatus according to claim 1,
wherein the receiver receives a distance packet transmitted from each of a plurality of end-point terminals, and
wherein the processing circuitry calculates an estimated distance between each communication terminal and each access point using the start-point distance, the end-point distance, and the terminal distance which are included in the received distance packet, and calculates coordinate values of each communication terminal using each calculated estimated distance and coordinate values of each access point.

* * * * *